July 18, 1961  D. F. McGILL  2,992,712
REVERSING HYDRO-STATIC TRANSMISSION
Filed April 16, 1957  13 Sheets-Sheet 1

INVENTOR.
DANIEL F. MCGILL
BY Cook and Schermerhorn
ATTORNEYS

INVENTOR.
DANIEL F. McGILL
BY
Cook and Schermerhorn
ATTORNEYS

INVENTOR.
DANIEL F. MCGILL
BY
Cook and Schermerhorn
ATTORNEYS

INVENTOR.
DANIEL F. MCGILL
BY Cook and Schermerhorn
ATTORNEYS

INVENTOR.
DANIEL F. McGILL

July 18, 1961

D. F. McGILL 2,992,712

REVERSING HYDRO-STATIC TRANSMISSION

Filed April 16, 1957

INVENTOR.
DANIEL F. McGILL
BY
Cook and Schermerhorn
ATTORNEYS

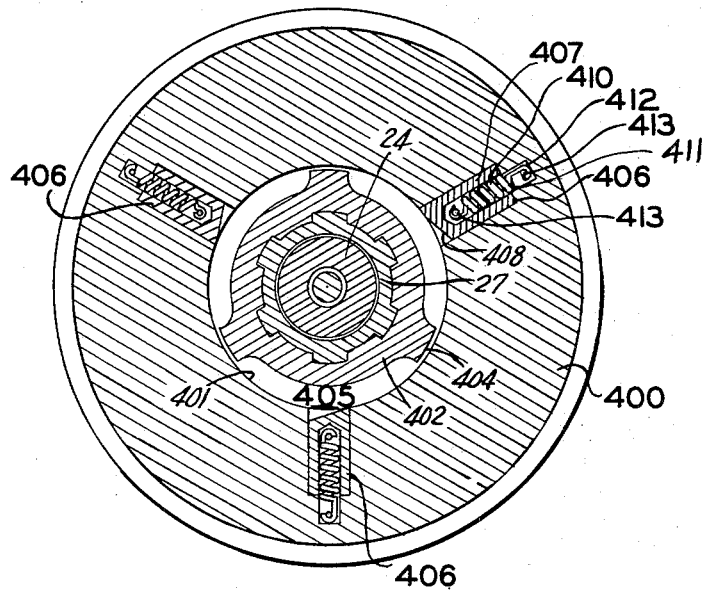
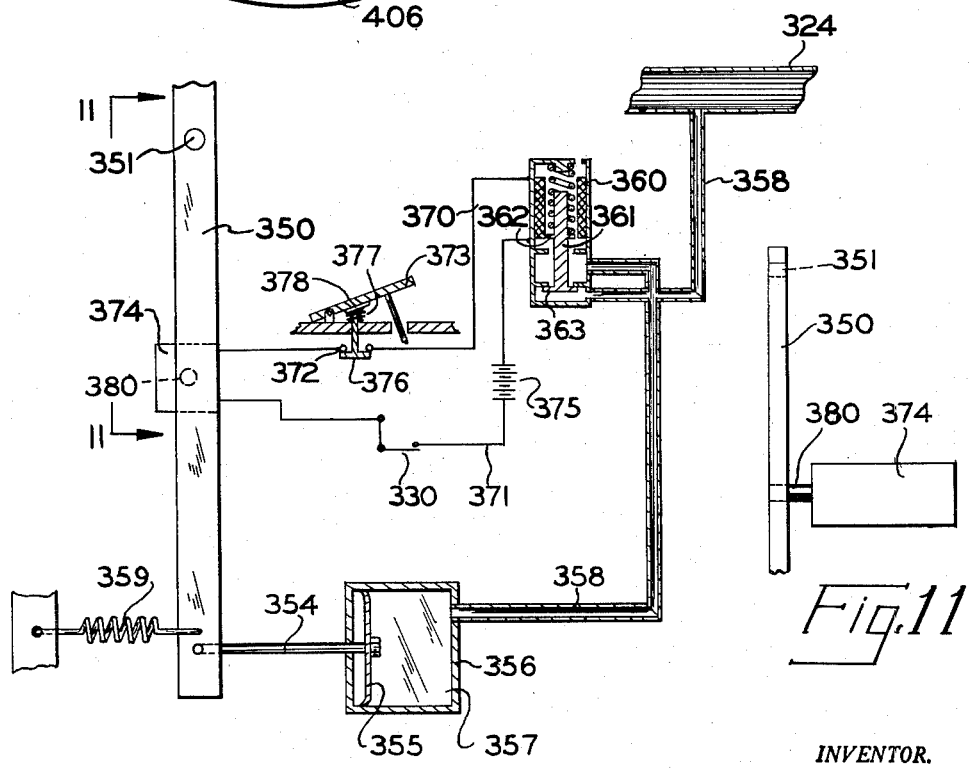

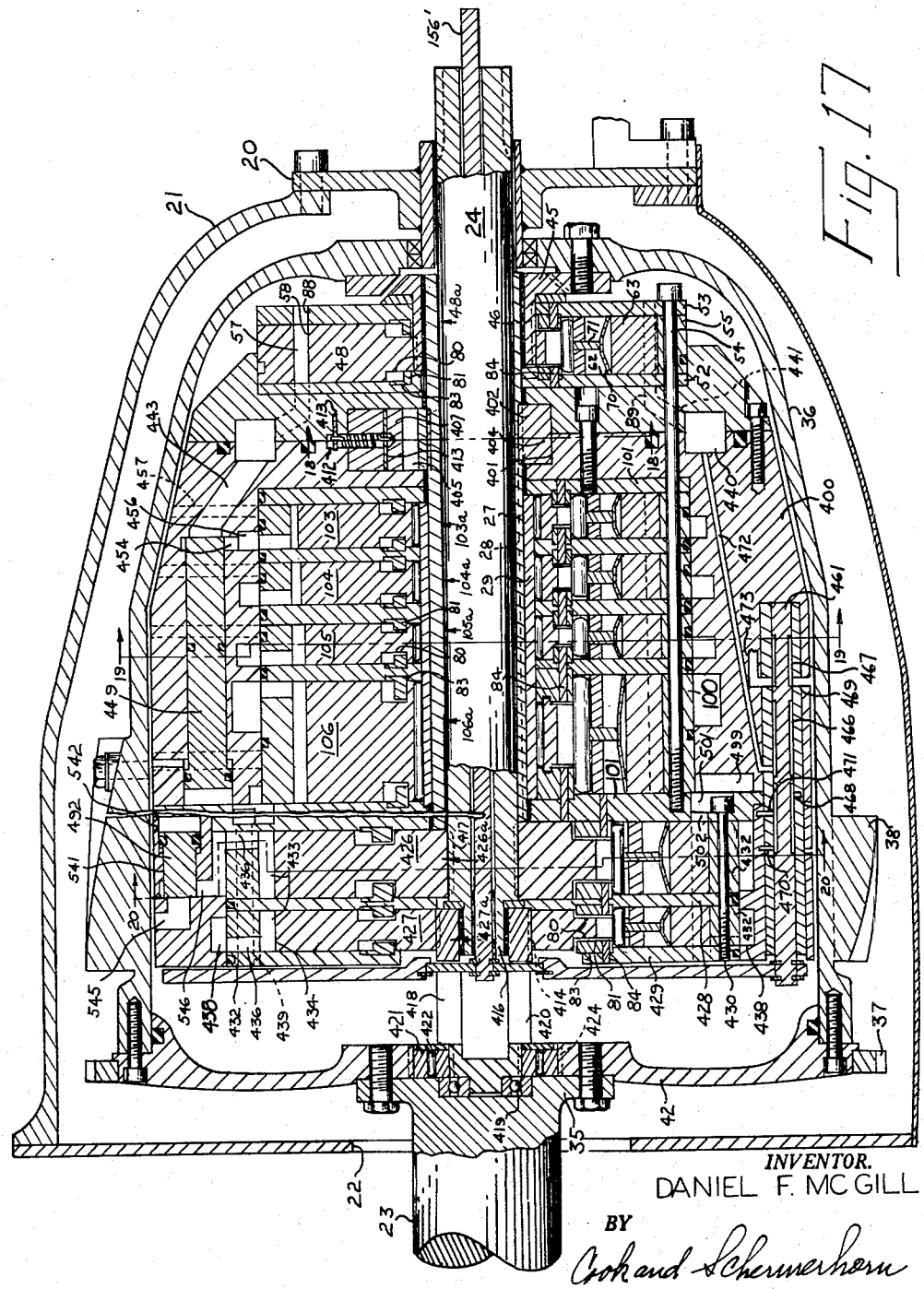

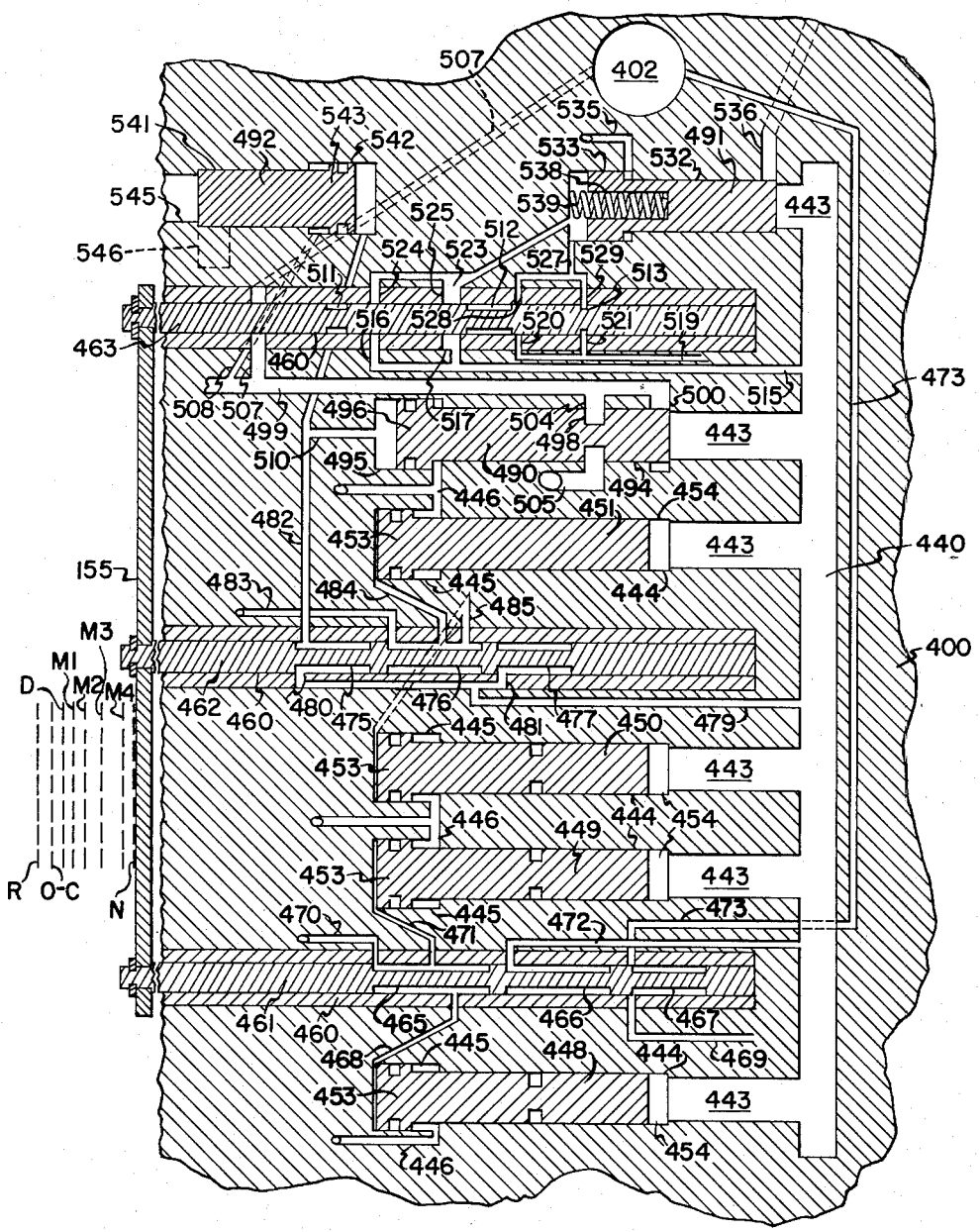
Fig. 2.1

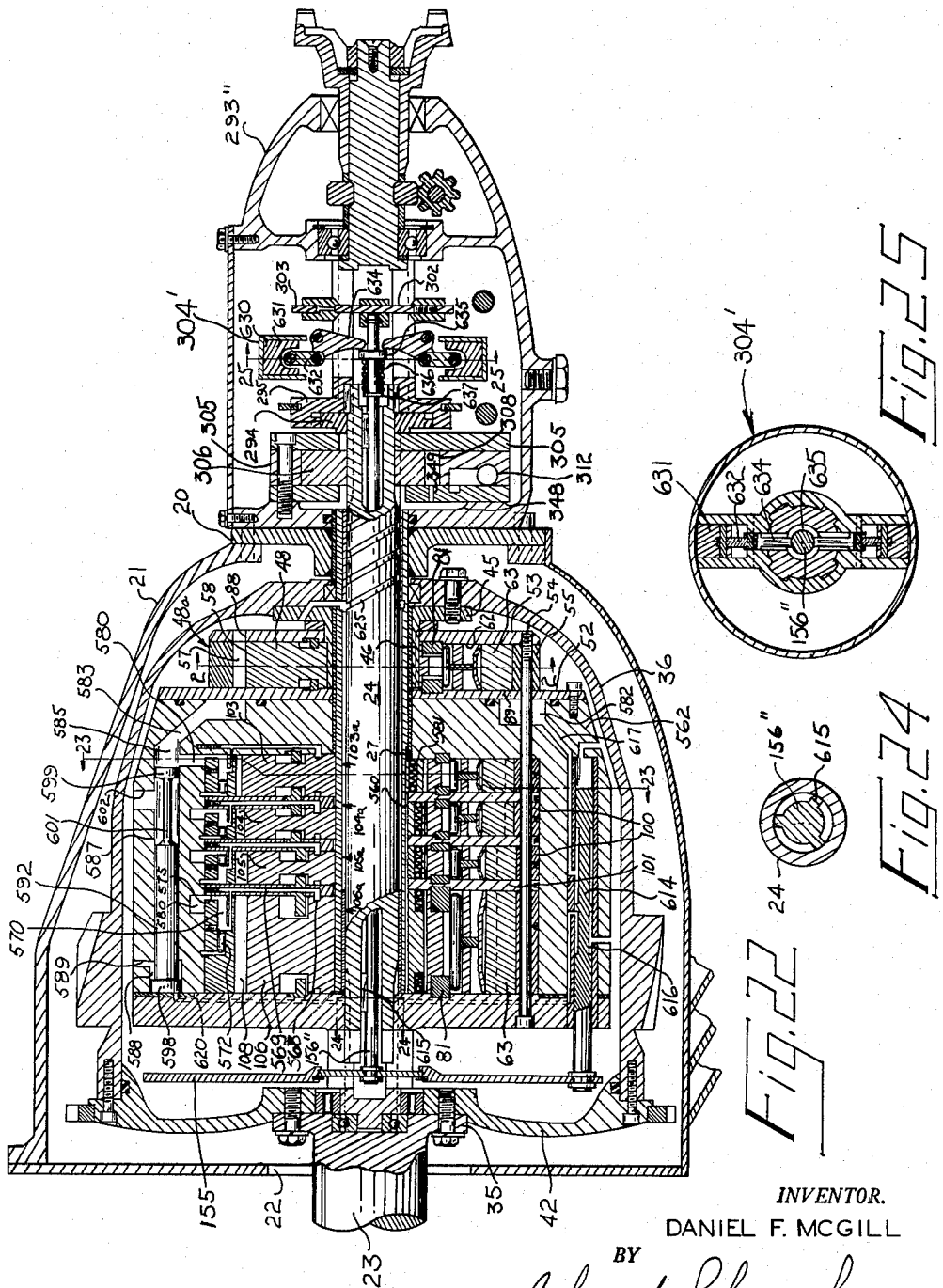

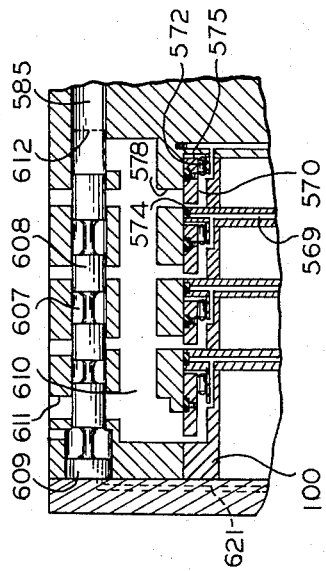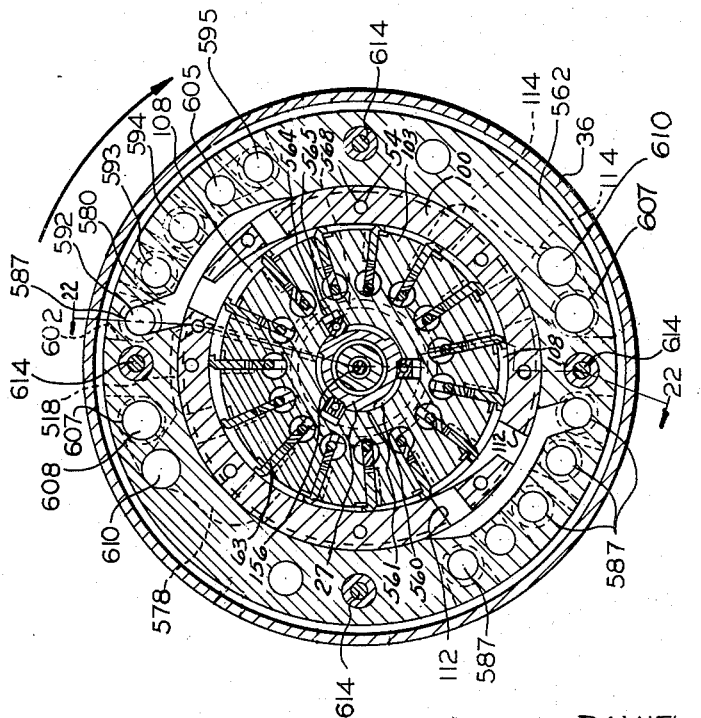

2,992,712
REVERSING HYDRO-STATIC TRANSMISSION
Daniel F. McGill, 2344 NE. 52nd Ave.,
Portland 13, Oreg.
Filed Apr. 16, 1957, Ser. No. 653,226
19 Claims. (Cl. 192—.098)

This invention relates to a transmission mechanism for transmitting power through a fluid medium from a driving shaft to a driven shaft in different speed and torque ratios and comprises an improvement over the transmission mechanism described and claimed in my Patent No. 2,658,343, granted November 10, 1953, for Rotary Pump and Motor Hydraulic Transmission.

A primary object of the present invention is to provide an improved displacement type hydraulic transmission which is compact in size, efficient in operation to avoid losses inherent in conventional fluid transmissions, and which is capable of transmitting power in certain definite driving ratios as well as an infinite number of other ratios depending upon torque requirements of the vehicle.

A further object is to provide a displacement type hydraulic transmission which has reversing means for driving the driven shaft of the vehicle in reverse.

Additional objects are to provide an improved transmission of the type described in which different ranges of driving ratios and direct drive are established by a novel valve assembly which selectively controls or prevents the circulation of the transmission fluid and in which the actual torque ratio at any instant may adjust itself automatically in response to the load within the limits of the range of ratios determined by the position of the valve assembly and to provide control means for said valve assembly operative in conjunction therewith for rendering said valve assembly automatic in adjusting itself in response to the torque requirement.

Another object is to provide an improved transmission having a variable displacement component with a plurality of reaction motor chambers which may be included in the fluid circuit in variable number and displacement volume to apply torque to the driven member in addition to the torque applied directly by the driving member.

Another object is to provide improved locking means adapted to lock a plurality of motor rotors individually to a stationary member when the motors associated with said rotors are placed in operation.

Another object is to provide novel rotor locking means utilizing fluid for absorbing initial stopping shock between the rotor and a stationary member.

An additional object is to provide a pump brake structure utilized in connection with the present transmission which is operative in response to manually operated electrical switch means for applying a braking force to the driven shaft for braking the vehicle when desired, such as on hills, which is automatically operative in response to a speed governor switch at slow forward speeds so as to be operative upon the driven shaft, as a mechanical lock when the vehicle stops, to prevent reverse rotation of the driven shaft for the purpose of holding the vehicle on a hill against reverse movement, and which is also operative by the emergency brake of the vehicle to lock the driven shaft when the emergency brake is applied to serve in addition to said emergency brake as a parking lock.

In certain preferred embodiments of the present transmission there is a driving member, a driven member and a plurality of motor rotors or reaction members all mounted and coaxially arranged so that the driving member serves as an external housing for the transmission and a reservoir to contain the transmission fluid. The driving member has a pump rotor rotatable therewith which cooperates with the driven member to form an expansible chamber pump to pump fluid to a plurality of expansible chamber motors through individual motor valves, the operation of which is controlled by ratio control valves. Direct drive is effected when the ratio control valves are in a position to permit the fluid pressure from the pump to be admitted to the top of all the motor valves, holding them closed to form a fluid lock in the pump, thereby causing the entire unit to rotate with the engine.

The motor valves as disclosed are of the piston type with an enlarged area or head on one end. The ratio control valves, as one function thereof, control the flow of fluid from the pump to the head of the motor valves and are operated by a control assembly responsive to torque requirements of the vehicle. When pressure is relieved at the head end of the motor valves, the fluid pressure from the pump opens the valves, placing the motors in operation, and when the ratio control valves are moved to a position so that fluid pressure is admitted to the head of the motor valves, said motor valves, because of the larger area of this end, are held closed and the motors are cut off. Working chambers are formed between the motor rotors and the driven member, and the motors are selectively cut in to increase the torque applied over the input torque of that of the engine, to the driven member in accordance with the pressures developed and the additional motor areas exposed to such pressures as the ratio control valves are moved away from closed position by the valve control assembly. With all the motors in operation, the motor component or unit is then operating at its maximum displacement and pressure to provide the lowest speed, highest torque driving ratio in certain intermediate positions of the ratio control valves, and when all the motors are cut out the component runs in an hydraulic lock in direct drive. Individual locking means for the motor rotors are provided between said rotors and a stationary portion of the transmission.

These embodiments have reversing means wherein the pump circulates fluid under pressure to the opposite sides of vanes on the motor rotors to cause the motors to impart reverse rotation to the driven member. The locking means hold the motor rotors stationary for either the forward or reverse drive when their respective motors are in operation to produce reaction fluid forces, but permit forward rotation thereof in forward drive when the motor is not in operation.

The ratio control valves are operated by a control assembly utilizing as a part thereof a speed responsive governor and a pressure responsive diaphragm operative in conjunction with the governor against a spring which tends to hold the controls in neutral. The control assembly is operative to move the control valves to different positions for admitting fluid to the various motor chambers through their respective motor valves in accordance with the torque requirement of the vehicle. Also operative in conjunction with the present transmission is a pump brake structure operative upon the driven shaft for imparting a braking effect to the vehicle at predetermined times. This pump brake mechanism is responsive to a manually operated electrical switch for applying an hydraulic braking force to the driven shaft of the vehicle when desired, such as when the vehicle is descending a hill. This pump brake mechanism is also responsive to a speed governor switch which places the mechanism in operation at a predetermined slow speed of the vehicle, whereby when the vehicle is stopped with the engine running, the pump brake applies a mechanical lock on the driven shaft in the reverse direction so that the vehicle will not roll backwards if on an incline. In addition, this pump brake structure mechanically locks the driven shaft when the emergency brake of the vehicle is applied.

In another embodiment, a first and second rotor are utilized in addition to the pump and motor rotors for accomplishing the forward drive and also a reverse drive and a ratio compression drive, the latter drive functioning as an hydraulic motor to provide braking effort over a one to one ratio drive against engine compression. This embodiment operates like the first embodiments mentioned except that the driven member is not splined to the driven shaft to accomplish the drive. The first rotor is splined to the driven shaft and the second rotor is splined to a stub shaft which is connected to the driving member through an overrunning clutch to drive the engine against compression when the output shaft tends to run faster than the engine. The driven member forms with the two rotors separate working chambers. An hydraulic lock is adapted to be formed in the working chamber associated with the first rotor to drive the driven shaft in the forward direction and an hydraulic lock is adapted to be formed in the working chamber associated with the second rotor to drive in a one to one ratio against engine compression. To drive in more than one to one ratio against engine compression, referred to herein as ratio compression drive, a hand lever opens a valve in a port between the first and second rotors. The vehicle wheels then drive the first rotor as a pump and the second rotor as a motor to drive the engine in more than one to one ratio against compression. The driven member is also locked stationary in this over drive. Reverse drive is effected by the shift of a hand lever to open a valve in a port between the pump and the first mentioned working chamber to cause its rotor to operate as a motor to drive the driven shaft in reverse. When the transmission is operating in reverse, the driven member is locked stationary.

In each of the embodiments, transmission gears are entirely eliminated. While the transmission controls may be operated by any desired means, the advantage of having torque responsive controls is to keep the transmission in direct drive at all low speeds of the vehicle as long as the engine is able to handle the load.

The invention will be better understood and additional objects and advantages will become apparent from the following description taken in connection with the accompanying drawings which illustrate preferred forms of the invention. It is to be understood, however, that the invention may take still other forms and that all such modifications and variations within the scope of the appended claims which will occur to persons skilled in the art are included in the invention.

In the drawings:

FIGURE 7 is a cross sectional view of the pump brake structure taken on the line 7—7 of FIGURE 5;

FIGURE 10 is a schematic view of a portion of the valve control means;

FIGURE 11 is a fragmentary edge view showing stop means for a lever in the valve control means;

FIGURE 17 is a longitudinal sectional view of a second embodiment of the invention utilizing independent reverse means and overdrive compression means, the portion thereof on the right-hand side of the break line being taken on the line 17—17 of FIGURE 19 and the portion thereof on the left-hand side of the break line being taken on the line 17—17 of FIGURE 20;

FIGURE 18 is a cross sectional view taken on the line 18—18 of FIGURE 17, showing a carrier lock for the driven member;

FIGURE 21 is a developed view taken on the line 21—21 of FIGURE 19;

FIGURE 22 is a longitudinal sectional view of still another embodiment, taken on the line 22—22 of FIGURE 23;

FIGURE 23 is a cross sectional view taken on the line 23—23 of FIGURE 22;

FIGURE 24 is a cross sectional view taken on the line 24—24 of FIGURE 22, showing control shaft mounting structure;

FIGURE 25 is a cross sectional view taken on the line 25—25 of FIGURE 22 showing governor structure; and FIGURE 26 is a fragmentary longitudinal sectionl view showing valve and associated structure.

Figure 1:
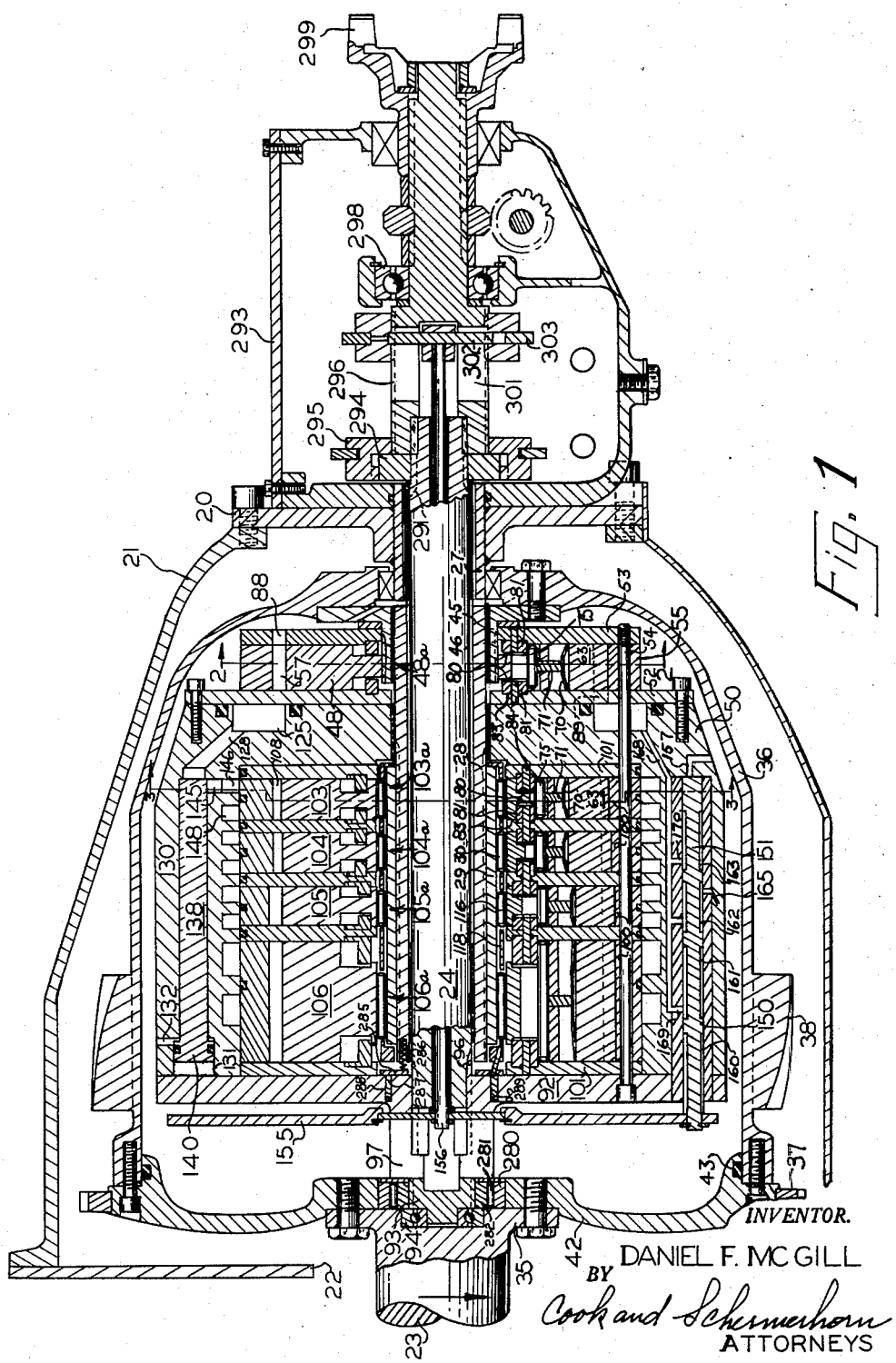
FIGURE 1 is a longitudinal sectional view of a preferred embodiment of the invention, taken approximately on the line 1—1 of FIGURE 3 with FIGURE 3 rotated through 180°.

*Figure 1 embodiment*

Figure 2:
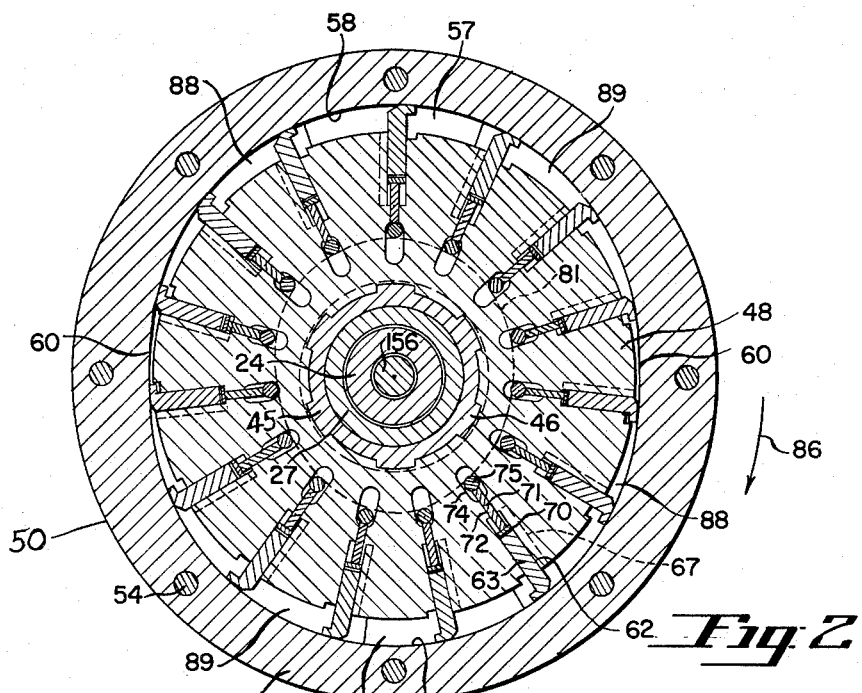
FIGURE 2 is a cross sectional view, taken on the line 2—2 of FIGURE 1, showing pump structure of the transmission.
Figure 3:
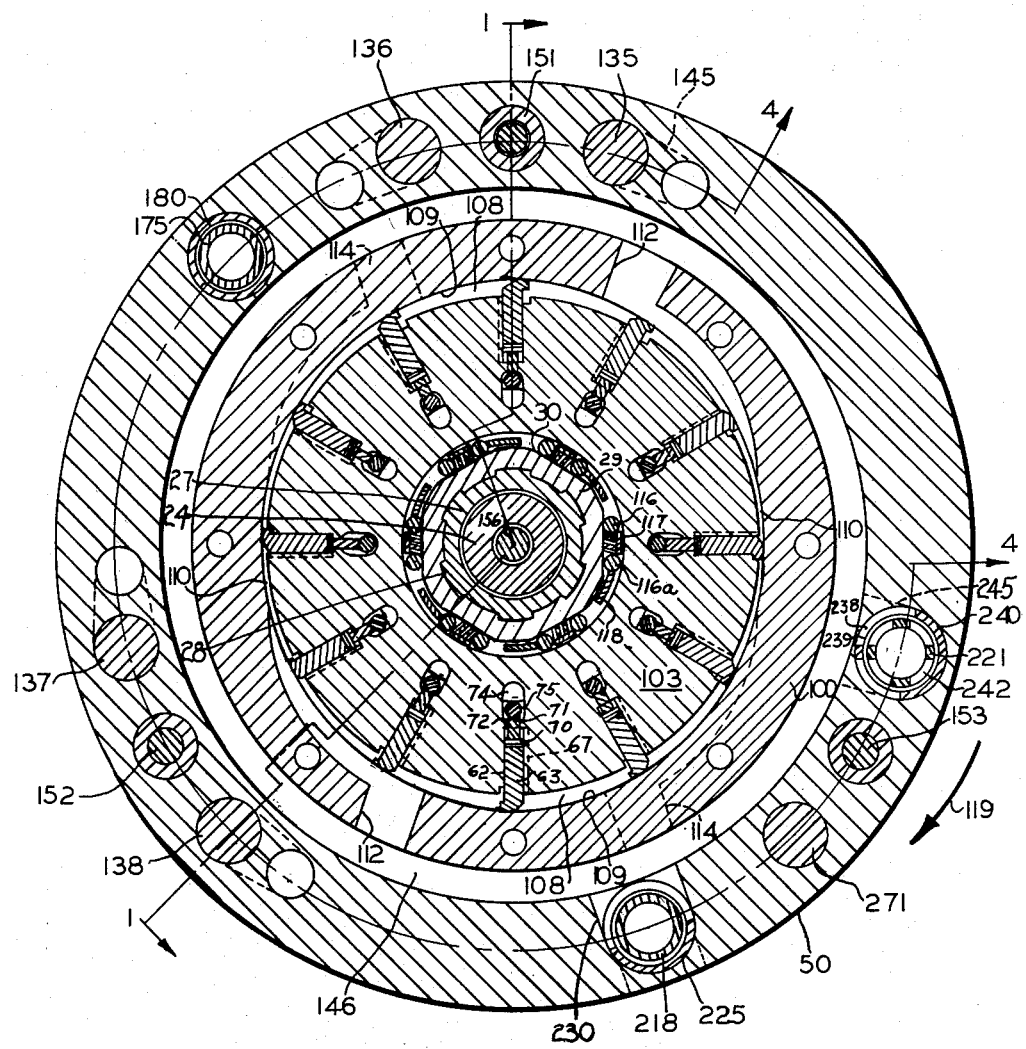
FIGURE 3 is a cross sectional view, taken on the line 3—3 of FIGURE 1, showing one of the motor rotors of the transmission.

FIGURES 1 through 4 show a first embodiment of the invention. The numeral 20 designates a stationary frame member comprising an integral part of the vehicle chassis, and bolted to this member is a housing 21 for the present transmission. The housing 21 has an opening 22 at the front end thereof, through which freely projects a drive shaft 23 from an internal combustion engine of a vehicle. The numeral 24 designates the driven shaft of the vehicle, whereby, in reference to the present transmission, the shaft 23 comprises the driving or input shaft and the shaft 24, which is in axial alignment therewith, comprises the driven or output shaft. The member 20 has an integral sleeve 27 having outer splines 28 for providing a stationary connection with another sleeve 29 having inner splines adapted to mesh with the splines 28 on the sleeve 27. The sleeve 29 is of shorter length than sleeve 27 and the outer peripheral surface thereof has longitudinal flattened portions 30 to form in cross section, as shown in FIGURE 3, a hexagonal configuration.

The drive shaft 23 is equipped with a flange 35 which is bolted to a driving member 36 of the transmission, FIGURE 1, and this driving member is equipped with a ring gear 37 engageable by the pinion gear of the starting motor of the engine. This driving member also has a plurality of spiral fan blades 38 circulating cooling air between the housing 21 and the driving member 36, the housing 21 having suitable openings, not shown, to atmosphere for permitting such circulation. The driving member 36 preferably has a front end plate 42 which is bolted to the drive shaft flange 35 and which is readily removable so that access may be had to the transmission parts within the housing. The plate 42 has a tight fit with the housing wherein the interior of the housing forms a fluid reservoir for the transmission, suitable O-ring sealing means 43 being provided between the housing and its cover plate 42. The housing 36 serves as the flywheel for the vehicle engine.

The rear end of the driving member 36 has an integral flanged sleeve 45 journaled on the stationary sleeve 27 for rotatably supporting this end of the driving member. Sleeve 45 has outer splines 46 on which is mounted a pump rotor 48, shown in cross section in FIGURE 2, having a central splined bore engageable with the splines 46 whereby this rotor revolves with the driving member 36, and, as the driving member 36 is integrally secured to the drive shaft 23 of the engine, the rotor 48 will rotate at all times that the vehicle engine is in operation. It will thereby be apparent as the description proceeds that the driving means comprises the member 36 and the pump rotor 48. As will be hereinafter described, the driving means is adapted to drive a driven member, designated generally by the numeral 50, by means of a pump component 48a formed between the rotor 48 and said driven member.

Rotor 48 is disposed between a pair of radial plates 52 and 53 having clamped therebetween, by studs 54, a ring or annular part 55. The inner peripheral surface of the ring 55 is shaped, FIGURE 2, to form diametrically opposite cavities 57 designated herein as pump or working chambers. The shape of the ring 55 provides cam surfaces 58 which approach closely to the surface of the rotor at two points 60 spaced 180° apart but which do not touch the rotor. As the pump chambers 57 are diametrically disposed in relation to the rotor, the fluid forces hydraulically balance the rotor in the ring 55 for efficient operation.

The periphery of rotor 48 is equipped with a plurality of slots 62 in which is slidably mounted radial vanes 63. One wall of each slot 62 on the pressure side of the vanes 63 has a groove 67 to admit fluid pressure to the inner end surface of the vane. The slot 62 for each of the vanes 63 is somewhat elongated and has disposed therein a curved leaf spring follower 70 adapted to move with the vane as the vane follows the shape of the cam surface 58. The convex portion of the curved spring 70 is disposed toward the closed end of the vane slot 62 and is engaged by a pin 71 slidable in a radial hole 72 in the rotor. The hole 72 intersects the bottom of a longitudinal slot 74 which contains a roller 75, and the inner end of the pin 71 engages the roller 75 at a point intermediate the ends of said roller.

The rotor 48 is provided with recesses 80 on opposite sides thereof, FIGURE 1, to receive a pair of cam rings 81 mounted in fixed position in recesses 83 in the plates 52 and 53, the rings 81 being fixedly held in place by pins 84. The radial distance between the cam rings 81 and the cam surface 58 is uniform all around the rotor, and the rollers 75 ride on the surfaces of the cam rings by the action of springs 70 and pins 71 when there is relative movement between the rotor and the driven means 50.

The grooves 67 communicate the working pressure to the top end of the vanes and balance the pressure between the two ends of the vanes, and with the fluid pressure thereby substantially balanced on the two ends of the vanes the rubbing friction between the outer ends of the vanes and the outer cam surface is substantially equalized throughout the entire inner surface of the ring 55. Since the vanes operate between inner and outer cams, the rollers, pins, springs and vanes operate in unison, and the only flexing movement of springs 81 is that involved in dimensional variations resulting from the machine tolerance. This tension is always enough to overcome the hydraulic unbalance with the pump or motor operating in either direction throughout the entire circuit. The vane structure and operation are described in detail in my co-pending application, Serial No. 503,249, filed April 22, 1955 and now abandoned, for Reversible Vane Pump.

When the driving member 36 rotates the rotor 48 in the direction of arrow 86, FIGURE 2, the vanes 63 sweep through the chambers 57 to draw in fluid through inlet ports 88, which communicate with the chambers 57 and the reservoir, and discharge it under pressure through outlet ports 89. The vanes 63 by reason of their mounting arrangement utilizing the balanced fluid pressure on the ends thereof produce an effective seal between the rotor and the ring 55 at all points of rotation to prevent fluid slippage and consequent torque loss.

The driven member 50 is equipped with a front cover plate 92 suitably bolted thereon for removal when desired to gain access to the interior of the driven member. The cover plate 92 has a stepped hub 93 journaled in suitable bearings 94 mounted in the end of the drive shaft 23. Hub 93 is internally splined at the rear portion thereof and these splines are in mesh with splines 96 on the end of driven shaft 24 wherein it will be seen that a driving connection is accomplished between the driven member 50 and the driven shaft 24. Hub 93 has a vertical slot 97 therein for the operation of control structure, to be described.

Driven member 50 comprises four rings or annular parts 100 clamped between five radial plates 101, FIGURE 1. Rotatably disposed between the sets of plates 101 are reaction members or motor rotors 103, 104, 105 and 106 which are similar in structure to the pump rotor shown in FIGURE 2 and which cooperate with the driven member to form hydraulic motors 103a, 104a, 105a and 106a, respectively. The inner peripheral surfaces of the rings 100 form diametrically opposite reaction or working chambers 108 between the rings and their respective rotors. Similar to the ring 55 utilized in connection with the pump rotor 48, the inner surfaces of the rings 100 provide cam surfaces, designated by the numeral 109, which approach closely to the surface of the rotors at two points 110 spaced 180° apart. Rings 100 are provided with a pair of inlet openings 112 and a pair of outlet openings 114, the outlet openings being shown in dotted lines. FIGURE 3 is taken through the rotor 103 to show the structure thereof and cooperating structure, but it is to be understood that the other three rotors and their cooperating structure are identical in that each rotor operates in connection with a pair of motor chambers with inlet and outlet openings.

Similar to the pump rotor 48, each of the motor rotors 103, 104, 105 and 106 is equipped with a plurality of slots 62 in which is mounted slidable radial vanes 63 associated with cam rings 81 mounted in the radial plates 100.

Each of the motor rotors 103–106 is centrally bored for mounting on the stationary sleeve 29, and disposed between the rotors and the sleeve 29 on each of the longitudinal flat portions 30 are overrunning clutch or locking means comprising pairs of rollers 116 and 116a held in spaced relation by a spring 117. The locking structure is held in particular positions by an apertured cylindrical cage 118 and is adapted individually to prevent relative rotation between the rotors and the stationary sleeve 29 except in forward drive at times when the rotors are not in operation. In forward drive of the driven member 50, in the direction of the arrow 119, FIGURE 3, fluid operated means, to be described, are operative on the cage 118 to hold it stationary in a counterclockwise direction to permit rotation of the rotors in the direction of said arrow but to prevent reverse rotation. In reverse drive, the fluid operated means changes the position of the cage to hold the rotors 103–106 stationary. The free rotation of a motor rotor in forward drive is necessary when the motor of that particular rotor is not in operation, so that no vacuum is developed in this part to produce a drag on the pump. When a motor is operating under pressure from the pump in forward drive, fluid in the motor chambers 108 attempts to rotate the rotor in a direction counter to the arrow 119, as viewed in FIGURE 3, and, as the locking means between the rotor and the sleeve 29 prevents such rotation, the fluid force applies torque to the driven member in the direction of the arrow, this torque being in addition to the torque produced by the pump. In reverse drive, the cage 118 is shifted to prevent clockwise rotation of the rotors whereby the fluid force applies a torque to the driven member in a direction counter to the arrow 119.

*FIGURE 1 valve assembly*

Figure 4:
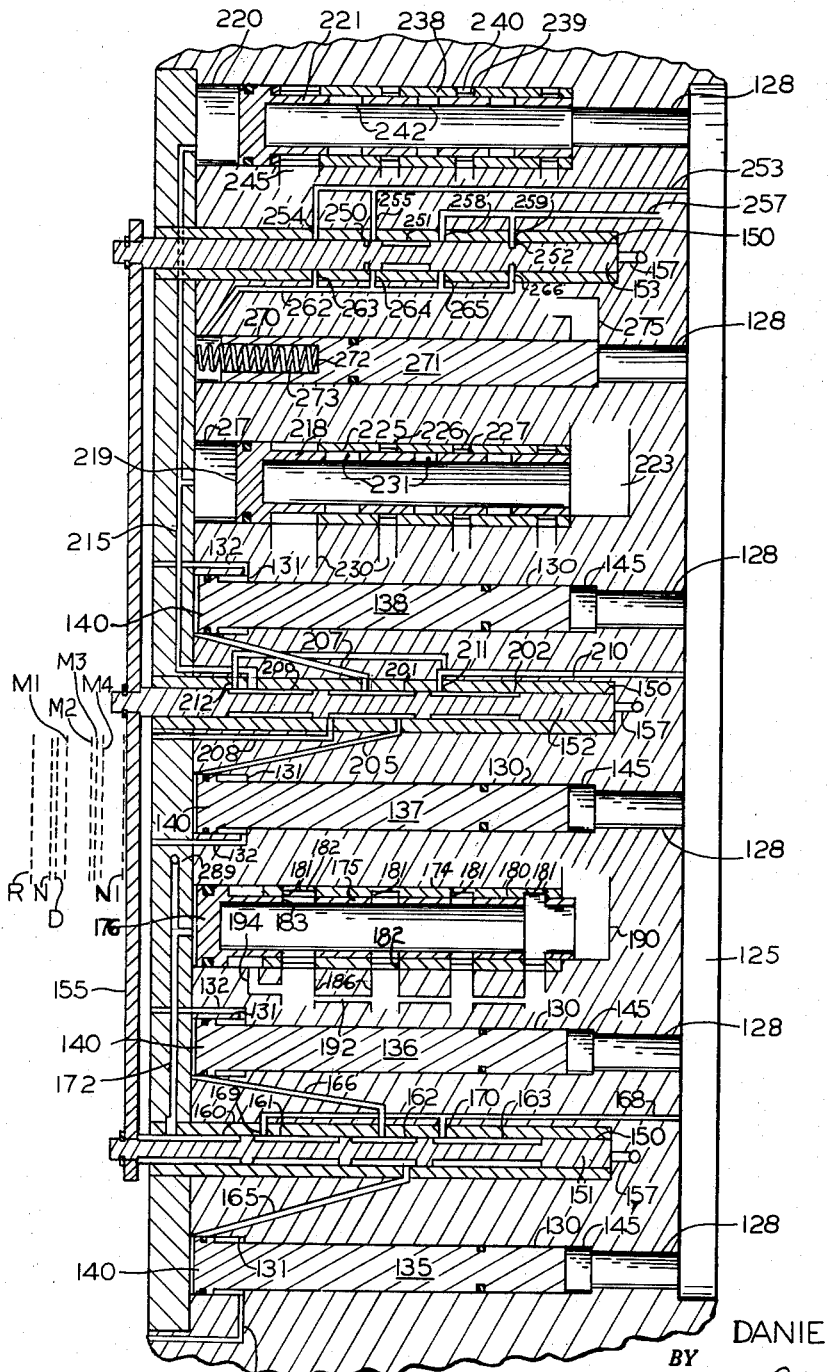
FIGURE 4 is a developed view, taken on the line 4—4 of FIGURE 3, showing the valve arrangement for the embodiment.

Fluid forced out of the outlet ports 89, FIGURE 1, by the relative rotation of the pump rotor 48 and the driven member 50 flows to an arcuate pump pressure chamber 125, FIGURES 1 and 4, having a plurality of short longitudinally disposed branch passageways 128, one of which is shown in FIGURE 1 and all of which are shown in the developed view of FIGURE 4. Four of the passageways 128 lead to longitudinal motor valve cylinders 130 having counterbored portions 131 at the front thereof each having communicating with the rear portion thereof a relief passageway 132 leading outside of the driven member comprising the reservoir. Slidably disposed in the motor valve cylinders 130 are piston type motor valves 135, 136, 137 and 138, and, although the particular arrangement of these motor valves is not critical for the operation of the various motors, as illustrated herein, the motor valve 138 controls the operation of motor 103a, motor valve 136 controls the operation of motor 104a, motor valve 137 controls the operation of motor 105a and motor valve 135 controls the operation of motor 106a. Each of the four motor valves has an enlarged head 140 disposed in the counterbore 131. The head 140 of these valves has a front surface area larger than the surface area of the opposite end of the valve, whereby, if an equal fluid pressure is applied on both ends of the valve, it will move to the right and be in closed position to prevent fluid under pressure from flowing to the motor controlled thereby.

Each of cylinders 130 for the motor valves 135–138 communicates with a port 145 which, in turn, communicates with an annular inlet passageway 146, FIGURES 1 and 3, for the motors 103a–106a whereby in the position of the valves shown in FIGURE 4 fluid under pressure from the pump can flow through pressure chamber 125, passageways 128, the rear portion of motor valve cylinders 130, port 145, and passageways 146 to the motors by means of inlet ports 112, FIGURE 3. Also associated with the motors are outlet passageways 148, FIGURE 1, in communication with the outlet ports 114, shown in dotted lines in FIGURE 3. Only the motor valve 138 is shown in FIGURE 1 and in this view it is shown in its rearward or closed position wherein fluid pressure from the pump 48a is cut off from the motor 103a.

Also provided in the driven member 50 are three control valve cylinders 150, FIGURE 4, in which are slidable a first ratio control valve 151, a second ratio control valve 152 and a third ratio control valve 153, all connected to a common cross bar 155, in turn connected to a control rod 156, FIGURE 1, slidable in a central bore in the driven shaft 24, the bar 155 being slidable longitudinally of the transmission in the vertical slot 97 of the hub 93. Each of the control valve cylinders 150 communicates with the reservoir at its rear end by means of a passageway 157 to prevent a fluid lock.

Ratio control valve 151 is disposed between motor valves 135 and 136 and has four annular grooves 160, 161, 162 and 163 in its peripheral surface. A plurality of passageways communicates with the cylinder 150 for this ratio control valve comprising a passageway 165 which leads to the front portion of the counterbore 131 of cylinder 130 for the motor valve 135, a passageway 166 leading to the forward portion of the counterbore 131 of cylinder 130 for the motor valve 136, a passageway 168 from the annular pump pressure chamber 125 having two outlet ports 169 and 170, and a passageway 172 which communicates with another valve cylinder 174 for a forward discharge valve 175 having an enlarged head portion 176.

The valve cylinder 174 has a bushing 180 with four inner peripheral grooves 181 adapted to register with orifices 183 in the discharge valve 175. Orifices 182 are provided in the wall of the bushing 180 at the grooves 181 and orifices 183 are adapted to communicate by means of the grooves 181 and orifices 182 with passageways 186 which are in communication with the outlet passageways 148, FIGURE 1, for the motors 103a–106a. Four of such passageways 186 are provided wherein fluid in the outlet passageways 148 can discharge during forward drive into the valve 175. Valve 175 is open at the rear end and passageway 190 communicates between the reservoir and the open end of the valve whereby fluid can flow from passageways 148 through the passageways 186, grooves 181 and orifices 183, valve 175 and passageway 190 to the reservoir. Linking passageways 192 extend between the passageways 186, and the passageways 186 adjacent the front of the valve communicate with the valve cylinder 174 behind the head 176 by means of a passageway 194 whereby when fluid under pressure flows behind the head 176 through the passageway 194, the forward discharge valve 175 is forced to its forward position, FIGURE 4, the bushing 180 terminating short of the front of cylinder 174 so that fluid from passageway 194 is capable of flowing behind the head 176.

The ratio control valve 152 is disposed between motor valves 137 and 138 and has three peripheral grooves 200, 201 and 202. A plurality of passageways communicate with the cylinder 150 for this ratio control valve comprising a passageway 205 leading to the forward end of counterbore 131 in the cylinder 130 for the motor valve 137, a similar passageway 207 for the valve motor 138, a passageway 208 to the reservoir, a passageway 210 having two outlet ports 211 and 212 and, finally, a passageway 215 which opens into a cylinder 217 for a reverse discharge valve 218 and into a cylinder 220 for a reversing valve 221. Reverse discharge valve 218 is slidable in a bushing 225 having peripheral grooves 226 with orifices 227 through the wall of the valve at the grooves in communication with passageways 230 which, in turn, communicate with the annular passageways 146, one such passageway 230 being provided for each of the four passageways 146. The reverse discharge valve 218 has orifices 231 adapted to communicate with the grooves 226 in the bushing 225 by means of orifices in reverse drive position of the transmission. This same valve in open at one end, and, in reverse drive, discharging fluid flows through it and out a passageway 233 to the reservoir.

Reversing valve 221 is open at the rear end and is slidable in a bushing 238 having internal peripheral grooves 239 and orifices 240 through the wall of the valve at the grooves. This valve has orifices 242 in its walls which are adapted, in reverse drive of the transmission, to register with the grooves 239, and, when the orifices 242 and grooves 239 are in registry, fluid can flow into the reversing valve through a passageway 128 and discharge through ports 245 communicating with the passageways 148 which, in forward drive, are the outlet passageways for the motors, but, in reverse drive, are the inlet passageways. In forward drive, the reversing valve 221 is held in its rearmost or righthand position wherein the orifices 242 and the grooves 239 are out of registry and no fluid flow takes place through this valve. Similarly, in forward drive, the valve 218 is held in its right-hand position and no fluid discharge occurs therethrough.

The third ratio control valve 153 has peripheral grooves 250, 251 and 252, and leading into the cylinder 150 for this valve is a passageway 253 having two outlet ports 254 and 255. A relief passageway 257 which leads to the reservoir communicates with the cylinder 150 for the ratio control valve 153 by two outlet ports 258 and 259. In addition, a passageway 262 is in communication with this cylinder at four points by ports 263, 264, 265 and 266. Passageway 262 leads to the front or left-hand portion of a cylinder 270 in which is slidable a neutral valve 271 having end walls of equal surface area, the neutral valve cylinder 270 at one end having communication with one of the passageways 128. Neutral valve 271 has a front end bore 272 in which is disposed a compression spring 273. In forward and reverse drives, fluid pressure is present at opposite ends of the neutral valve 271, and, as this valve has equal end surface areas, such fluid pressure exerts equal and opposite thrusts against the valve with the result that the biasing action of spring 273 holds the valve to the right in closed position. However, when the fluid pressure at the left of the neutral valve is relieved, as when the ratio control valves are in neutral position, the fluid pressure at the opposite end of the valve will overcome spring 273 and the valve moves to the left into open position. A passageway 275 communicates between the right end of the cylinder 270 and the reservoir, and, when the ratio control valves are in neutral position and the neutral valve is opened as described, fluid can flow directly from the passageway 128 to the reservoir through the passageway 275. When the system is in neutral, the left end of the neutral valve cylinder 270 communicates with the reservoir through passageway 262, port 266 which is in registry with groove 252 of the valve 153, and port 259 of passageway 257 which is also in communication with groove 252. With the valve assembly in neutral position, it will be seen that no fluid under pressure from passageway 168 can flow into the passageways 165 or 166 through the ratio control valve 151, and, similarly, no fluid pressure from passageway 210 can flow into passageways 205 and 207 through ratio control valve 152.

In the use of the present transmission with a motor vehicle, it is desirable to prevent the overrunning of the driven shaft relative to the drive shaft. To accomplish this feature, an overrunning clutch 280, FIGURE 1, utilizing rollers 281 operative on flat portions of a sleeve 282 is carried by the drive shaft and is operative on the hub 93 of the driven member 50. This overrunning clutch also permits the automobile to be pushed for starting.

*FIGURE 1 valve operation*

In setting forth the operation of the valve assembly described above, there is shown by broken lines in FIGURE 4 the positions of the cross bar 155 for the various stages of operation of the ratio control valves. A first position, designated by the character N1, is the neutral position mentioned in the detailed description of FIGURE 4 above. The next four position designations moving from right to left, comprise M4, in which four motors are in operation in forward drive, M3, in which three motors are in operation, M2, in which two motors are in operation, and M1, in which one motor is in operation. Following the M1 position are direct drive, designated by the character D, neutral, designated by the character N, and reverse, designated by the character R.

In the neutral position N1 of the ratio control valves, the spring end of the neutral valve communicates with the reservoir by means of passageway 262, port 266, groove 252 of ratio control valve 153, port 259 and passageway 257 whereupon fluid flowing from the pump holds neutral valve open and said fluid discharges into the reservoir through passageway 275. As the cross bar 155 is moved slightly forwardly, no fluid circuit change occurs in the system except in connection with the valve 153. The change which occurs is that groove 252 is moved out of registry with ports 259 and 266 and groove 251 moves into registry with ports 255 and 264. Fluid pressure can now flow to the front end of neutral valve 271 through passageway 253, port 255, groove 251, port 264, and passageway 262. As the fluid forces on opposite ends of the neutral valve are now balanced, the spring 273 will hold said valve to the right in its closed position. In this position of the control system, with the neutral valve closed, all the motors are placed in operation to represent the lowest speed driving ratio and the highest mechanical advantage obtainable by the transmission.

All the motors at this time are in operation because the grooves on the ratio control valves and the outlets of the passageways between the cylinders for the ratio control valves and the cylinders for the motor valves are located so that no communication has yet been established between the pump pressure chamber 125 and the front or left end of the motor valves, and these valves thereby are held in their forward ratio positions by fluid pressure at the rear end thereof. Such position of the ratio control valves is designated by the character M4. Also in this position of the ratio control valves, fluid under pressure from passageway 168 cannot flow into passageway 172 because the groove 161 in the ratio control valve 151 has not moved into registry with the end of this passageway, whereby fluid being discharged from the outlet passageways 148, FIGURE 1, of the motors can flow from said passageways into passageways 186 to be discharged through the forward discharge valve 175 into the reservoir through passageway 190. Forward discharge valve 175 is held in its leftward position in forward drive by fluid discharging through passageways 186, the fluid flowing from passageways 186 to passageway 194 behind the head 177 of said valve. As the passageways 186 are all connected by linking passageways 192, if fluid under pressure exists in either of the four first mentioned passageways, it will flow under sufficient pressure to the passageway 194 to maintain the forward discharge valve 175 in its left-hand or forward position. Also, in this same position of the ratio control valves, as well as in all other forward ratio drives and direct drive, the groove 200 in the ratio control valve 152 is in registry with the port 212 of passageway 210 and with the passageway 215, whereby fluid under pressure is admitted to the front of reverse discharge valve 218 and reversing valve 221 to hold these valves in their right-hand position. In this position of the reverse discharge valve 218, passageways 230 are out of registry with grooves 226 and no fluid flow exists through this valve. Similarly, the orifices 242 in the reversing valve 221 are out of communication with the passageways 245 and no fluid flows through this valve.

With the movement of the ratio control valves an additional amount in a forward direction to the position designated by the character M3, the groove 163 in the ratio control valve 151 moves into registry with the passageway 165, whereupon fluid under pressure can flow from the passageway 168 through port 170, groove 163, passageway 165 and into the cylinder 130 at the left end of the motor valve 135. As the head 140 of the motor valve 135 is of larger area than the opposite end, such fluid pressure will move the motor valve rearwardly and cut off the port 145 which communicates with the passageway 146 for the motor 106a. Motor 106a is thereby cut out, and, with no fluid pressure acting thereon, the rotor 106 will rotate freely with the driven member and such free rotation prevents any vacuum from being created therein which would tend to cause a drag on the driven member. Groove 163 is of a sufficient length to cause the motor 106a to be cut out in all the remaining ratio drives as well as in direct drive.

With additional movement of the ratio control valves in a forward direction to the position designated by the character M2, the groove 202 of ratio control valve 152 moves into registry with the passageway 205 wherein motor valve 137 is moved to the right by fluid pressure to cutout motor 105a. Passageway 166 leading to the cylinder 130 for the motor valve 126, and passageway 207 leading to the cylinder 130 for the motor valve 138 receives no pump pressure at this stage and the motor valves 136 and 138 remain in their forwardly disposed positions to permit fluid under pressure to be admitted to and operate motors 104a and 103a, respectively.

Upon further movement of the ratio control valves to position designated by M1, the groove 163 or ratio control valve 151 moves into registry with passageway 166 so that fluid under pressure from passageway 168 is admitted to the front of the cylinder for the motor valve 136 to move this motor valve rearwardly and cut off fluid pressure to the motor 104a, this valve being actuated by fluid flowing from passageway 168, port 170, groove 163 and passageway 166 into the cylinder 130. The passageway 207, which leads to the cylinder 130 for the motor valve 138, remains closed at this stage by the ratio control valve 152, and, in such condition of the valve assembly, the motor 103a is the only one in operation. This position of the ratio control valves is designated by the character M1.

With additional forward movement of the ratio control valves, groove 202 of ratio control valve 152 moves into registry with passageway 207 leading to the forward end of the motor valve 138, and this motor valve is then closed to cut off motor 103a. Fluid pressure in this position of the valve assembly is also still introduced to the front of all the other motor valves so that all the motors are now cut out, and since the fluid is an incompressible medium and does not circulate through the motors, the driving member 36 cannot rotate relative to the driven member 50. In this position, therefore, the driving member and the driven member are hydraulically locked together and there is established in the transmission the equivalent of a direct mechanical connection between the driving shaft 23 and the driven shaft 24, the reaction members rotating freely with the driven member. This last mentioned position of the ratio control valves is their direct drive position and is represented by the character D.

The next forward movement of the ratio control valves results in a neutral condition, designated by the character N, wherein the groove 252 of ratio control valve 153 moves into registry with the port 258 and the port 265 wherein fluid in the passageway 262 can be discharged into the reservoir, allowing the neutral valve 271 to advance forwardly.

At the limit of forward travel of the ratio control valves, which comprises the reverse position designated by the character R and which is accomplished by a manual shift lever, the direction of the fluid from the pump is caused to move through the motors in the opposite direction to place the transmission in reverse. In this position of the ratio control valves, the groove 161 in the valve 151 is in registry with the passageway 172 which communicates with the front end of cylinder 174 in which is slidable the forward discharge valve 175. At this time the groove 161 is also in registry with port 169 and fluid pressure from passageway 168 thereby forces the forward discharge valve 175 rearwardly to move the orifices 183 therein out of registry with grooves 181 whereby there is no fluid flow through this valve. At this time the groove 201 of ratio control valve 152 is in registry with both the passageway 215 and the passageway 208 which leads to the reservoir whereupon the fluid in the passageway 215 and in front of the two valves 218 and 221 can discharge to reservoir. Fluid under pressure in the passageway 128, which leads to the reversing valve 221, engages the interior front wall of the valve 221 and moves said valve to its leftward position, whereupon the orifices 242 and 240 are in registry. Fluid under pressure then can flow into the valve through the passageways 245, and, as these passageways communicate with respective passageways 148, FIGURE 1, in the motors 103a–106a, fluid pressure is admitted to the opposite sides of the vanes from that of forward drive, the fluid moving into the motor chambers 108 through the ports 114. The fluid is discharged through ports 112 into the annular passageways 146, and from the passageways 146 the fluid flows to the passageways 230. Fluid pressure in passageways 230 flows against the rear outer surface of the head 219, whereby such fluid pressure causes the reverse discharge valve 218 initially to move to its leftward position. Thereupon, the grooves 226 register with orifices 231 and fluid in passageways 230 can flow through the valve and into the reservoir through passageway 223. The discharging fluid engages the inner wall of the head 219 of reverse discharge valve 218 to hold said valve in its leftward closed position. All four of the motors 103a–106a are in operation in reverse but the motor valves 135, 136, 137 and 138 are held in their rearmost closed position by fluid pressure which is present at the front end of the cylinder. As all the motors operate in reverse, fluid will be present in the passageway 230 adjacent the head of reverse discharge valve 218 whereby fluid under pressure will always be available to initially move the valve to the left. No linking passageways between the passageways 230 are necessary as was the case in connection with the forward discharge valve 175.

To accomplish the proper reaction function in reverse drive, the rotors 103, 104, 105 and 106 must be held against clockwise rotation, as viewed in FIGURE 3, and, in this regard, an actuating ring 285, FIGURE 1, is operative to rotate the cage 118 a small amount in a clockwise direction, FIGURE 3, to allow the rollers 116a to move clockwise to a position preventing relative rotation between the rotors and the stationary sleeve 29. The reversing ring 285, FIGURE 1, is actuated in the reverse drive of the transmission against springs 286 by a ring piston 287 in an annular cylinder 288. Fluid under pressure is adapted to be supplied to the cylinder 288 by means of a communicating passageway 289, which, in turn, communicates with the passageway 172, FIGURE 4. As was described hereinbefore, when the ratio control valves have been moved to the reverse position, the passageway 172 has fluid pressure therein and this fluid pressure flows through the passageway 289 to the annular cylinder 288 to cause the ring to move the cage 118 to the desired position.

When the manually operated shifting lever is returned to the forward drive position the groove 160 of the ratio control valve 151 is moved into registry with the passageway 172 whereby fluid in said passageway can discharge into the reservoir, the portion of the valve which is grooved at 160 projecting from the front end of the driven member so that the fluid will thus flow freely therefrom into the reservoir. This release of pressure in the passageway 172 permits the spring 286 to return the actuating ring 285 to its position for forward drive. In forward drive, fluid is discharged through the annular passageways 148, FIGURE 1, and flows out passageways 186, FIGURE 4, which communicate with the annular passageways 148, and the forward discharge valve 175 is returned from its rearwardly disposed reverse position to its forward position by fluid pressure flowing from the passageways 186 through the passageway 194 communicating with the counterbore behind the head 176 of this forward discharge valve. Also, in moving the controls from reverse into the forward drive position, the passageway 215 which communicates with the front end of the cylinders for the reverse discharge valve 218 and the reversing valve 221 is again subjected to pressure to move these valves to their rearwardly disposed retracted position.

Referring specifically to FIGURE 1, a control box 293 is mounted on the stationary member 20 at the rear of the transmission. The rear end of driven shaft 24 projects into this box and is splined at 291 for receiving a gear 294 adapted to mesh with a ring gear 295 having a splined connection with a shaft extension 296 journaled on the end of driven shaft 24 and in a bearing 298 supported by the control box. The end of the shaft extension 296 carries a universal joint 299 for connection to the vehicle torque tube, and has a vertical slot 301 in which is slidable a cross bar 302 mounted on the end of the control rod 156 and connected to a yoke 303. The yoke 303 is connected to lever means, to be described, which is operated by suitable control means for moving the control rod 156 and the ratio control valves in the driven member in longitudinal directions for changing the ratio output or drive positions of the transmission. The gear 295 is adapted to be slid out of engagement with the gear 294 by suitable lever means, not shown, to provide free wheeling between the driven shaft 24 and the shaft extension 296 whereby the rear wheels of the vehicle are disconnected from the engine and the vehicle can be pushed freely without operating the engine, if desired.

*Pump brake structure*

Figure 5:
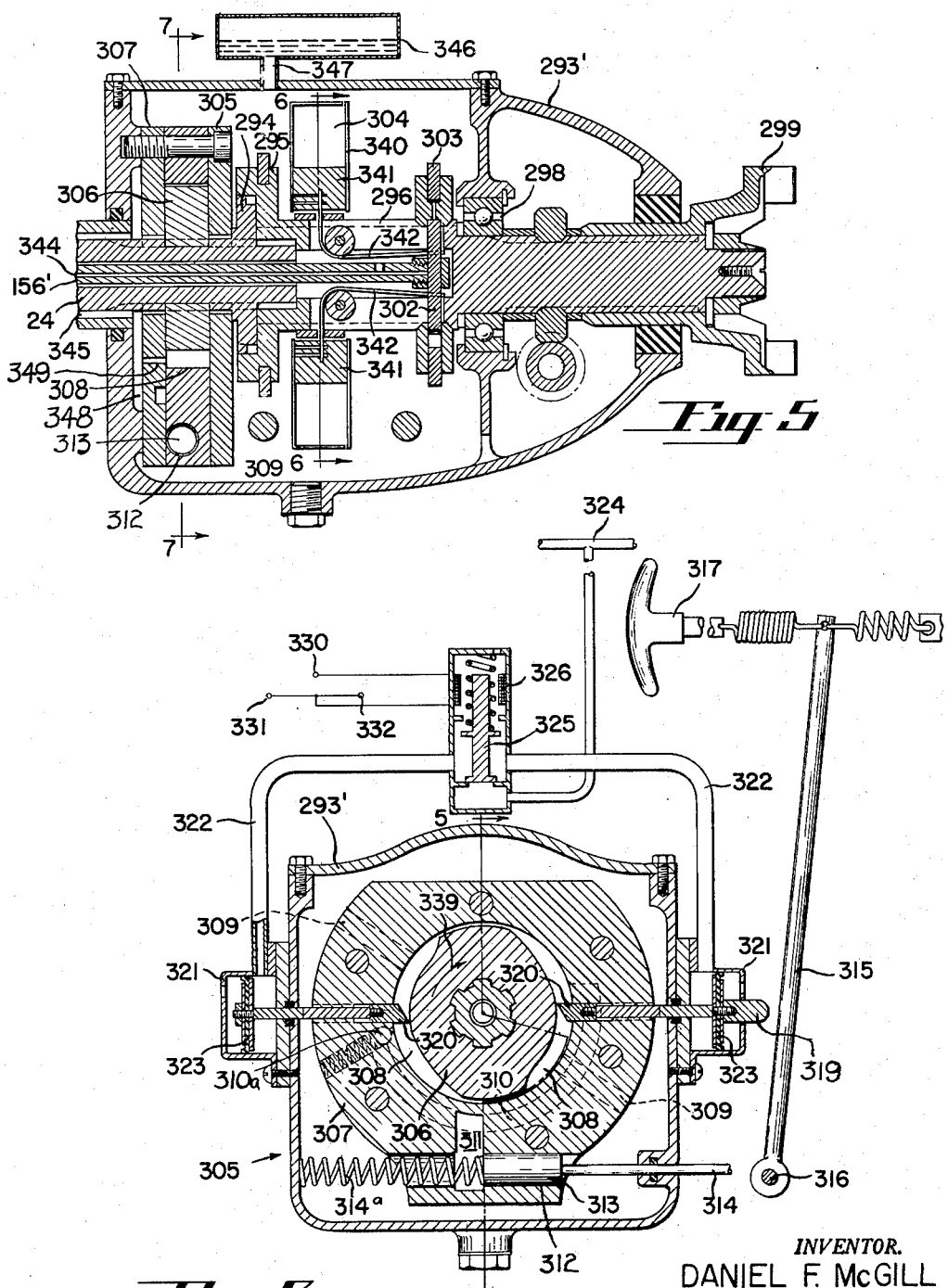
FIGURE 5 is a longitudinal sectional view of a control box which houses the pump brake structure and a governor utilized with the valve control assembly.
Figure 6:
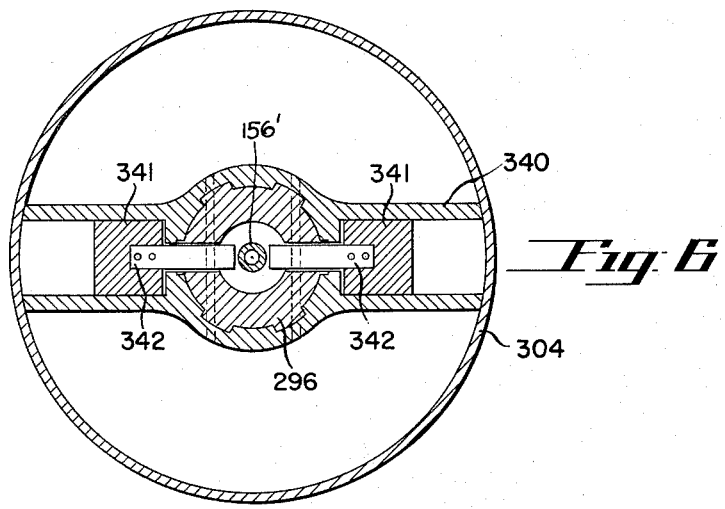
FIGURE 6 is a cross sectional view of the governor, taken on the line 6—6 of FIGURE 5.

Referring particularly to FIGURES 5, 6 and 7, there is shown a preferred control box structure 293' which, in addition to the one illustrated in FIGURE 1, has a governor 304 therein and a pump brake mechanism 305. The driven shaft 24 projects into the control box 293' and is splined for receiving in meshed relation a two-lobe pump rotor 306 housed in a stator 307 bolted to the front wall of the control box. The pump brake structure has two chambers 308, FIGURE 7, each having inlet passageways 309 and outlet passageways 310, the passageways 310 leading to a common outlet port 311 which communicates with a bottom transverse bore 312 in the stator. Slidable in the bore 312 is a piston valve 313 having a stem 314 projecting beyond one side of the housing and connected to operating means in the driver's compartment, not shown, which preferably comprises a foot-operated pedal. The valve 313 is adapted to slide in the bore 312 to a position which closes off the port 311 for controlling the flow of discharge fluid from the chambers 308. This valve is urged into open position by a spring 314a. One of the outlet passageways 310 has spring-pressed ball check valve 310a which prevents the flow of fluid into the adjacent pump chamber for reasons to be described.

The pump brake structure has opposing vanes 320 slidably mounted in the stator and adapted to be held against the rotor by a pair of vacuum cylinders 321 having intakes connected to vacuum lines 322 between a diaphragm 323 therein and the inner end of the diaphragm housing. One of the vanes has an extension 319 projecting through the back wall of the diaphragm cylinder 321, and this extension is in the path of a lever 315 pivoted on a pin 316 and operable by the vehicle emergency brake handle 317. When the emergency brake handle is moved to the left to its set position, the lever 315 engages the extension 319 and moves the vane into engagement with the rotor 306.

Vacuum lines 322 are connected to the vehicle intake manifold 324 through a spool valve 325 operated by a solenoid 326. The coil of solenoid 326 is series connected with the ignition switch 330, and, with the ignition switch turned on, the coil of this solenoid is adapted to be energized by a switch 331 which is closed by the pedal operatively connected to stem 314. The coil of this solenoid is also energized upon the closing of a governor switch 332, shown in detail in FIGURES 8 and 9, which, as will be seen, automatically causes the operation of the solenoid when the vehicle has slowed down to a predetermined speed.

Figure 8:
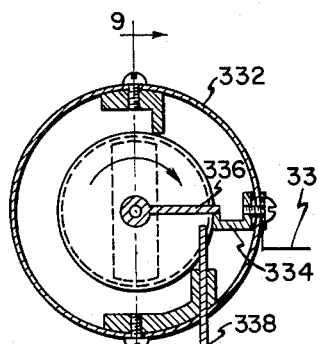
FIGURE 8 is a cross sectional view taken on the line 8—8 of FIGURE 9, showing a governor switch adapted to actuate the pump brake structure.
Figure 9:
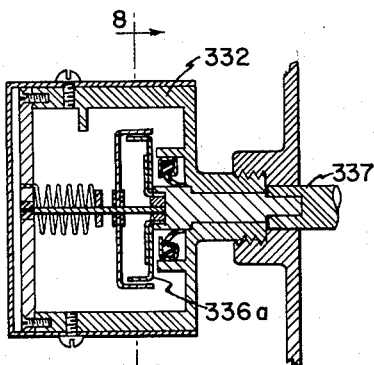
FIGURE 9 is a longitudinal sectional view taken on the line 9—9 of FIGURE 8.

The governor switch 332, FIGURES 8 and 9, has a switch contact 334 which leads to ground by a wire 335. A spring-controlled magnetic governor of well-known structure has a contact arm 336 operative with a magnet 336a and connected to the speedometer cable 337. The contact arm 336 is caused by the governor to be disengaged from the ground contact 334 when the vehicle has exceeded a certain slow speed, such as five or six miles per hour. Below this speed the contacts are in engagement to cause the energization of the coil of solenoid 326 which lifts the valve 325 to permit vacuum from the manifold 324 to be introduced to the vacuum cylinders 321 to draw the diaphragms 323 toward each other and move the vanes 320 into engagement with the pump rotor 306. It is apparent, therefore, that as the vehicle slows down to a certain speed the governor switch will be closed to cause the energization of the coil of the solenoid 326 whereby vacuum of the intake manifold causes the vanes 320 to engage the rotor. It is necessary that the pump brake mechanism 305 be rendered inoperative when the vehicle is to move in reverse, and to accomplish such purpose a pin 338 is slidably mounted in the wall of the housing for the switch 332. This pin is in the path of the vehicle hand shift lever, not shown, and when said shift lever is moved into reverse the pin is moved inwardly into engagement with the contact arm 336 to lift this arm off the contact 334. Separation of these contacts deenergizes the coil of solenoid 326 to render the pump brake mechanism inoperative.

Referring again to FIGURE 5, a gear 294 having internal splines is mounted on the driven shaft 24 in mesh with the splined portion of said shaft, and this gear is in mesh with a ring gear 295 splined on a shaft extension 296 journaled on the end of driven shaft 24 and in bearing members 298. Shaft 296 carries a universal joint 299 and, with the gears 294 and 295 in meshing relationship, the pump rotor 306 rotates with the rear wheels of the vehicle in the direction of arrow 339, FIGURE 7.

The operation and purpose of the pump brake structure 305 will now be set forth. When descending a hill or when it is otherwise desired to apply braking action to the driven shaft, in addition to the 1:1 braking compression effected through the transmission, the operator moves the valve 313 by means of the foot pedal connected to the stem 314. Operation of said foot lever closes the switch 331 to energize the coil of solenoid 326 which lifts the spool valve 325 to permit the flow of vacuum to the cylinders 321 for operating the vanes 320. With the vanes 320 in engagement with the rotor 306, fluid is drawn in through inlet passages 309 and discharged through the outlet passage 310 and port 311. As the operator depresses the foot pedal mentioned, the valve 313 moves in its bore across the opening of the bore 311 to restrict the flow of discharging fluid therefrom. With this resriction in the discharge of the fluid, the pump will exert braking action on the driven shaft, and the extent of braking action will depend upon the amount of travel of valve 313 across the opening of port 311. Suitable circuit breaking means, not shown, are operative in conjunction with the foot pedal for the valve 313 to open the switch 331 as soon as the operator releases said foot pedal.

The pump brake structure 305 is also utilized as a hill-holding mechanism, in that, when the vehicle slows down, the governor switch 332 automatically closes to energize the coil of solenoid 326 for operating the vanes, and, when the vehicle stops, the vanes remain in engagement with the rotor 306. If the stop is made on a hill, the mechanical engagement of the vanes against the lobes of the rotor will resist reverse rotation of the rotor. Suitable circuit breaking means for the switch 332, not shown, are operated by the vehicle accelerator pedal for opening this switch when the accelerator pedal is pressed downwardly. In addition, this pump brake structure is utilized as a parking lock, in that with the emergency handle 317 pulled to the left, FIGURE 7, the lever 315 engages the vane extension 319 and causes the one vane 320 to be moved inwardly into mechanical engagement with the pump rotor 306. With this one vane locked positively against the rotor 306, said vane will not ride over a lobe of the rotor, and therefore, the driven shaft is locked against rotation. The foot lever which is operatively connected to the stem 314 is preferably provided with locking means, not shown, which holds it in its fully depressed position to provide an additional parking lock in that in this locked position of the foot lever the valve 313 closes the opening of port 311 to prevent discharge of fluid therefrom. Thereupon, fluid is trapped on the one side of the vane to lock the rear wheels of the vehicle in a set position. The ball check valve 310a prevents backflow of liquid into the other pump chamber. The parking lock is released by unlocking the foot lever which controls the operation of valve 313 and releasing the emergency brake handle 317.

*Valve control mechanism*

Figure 12:
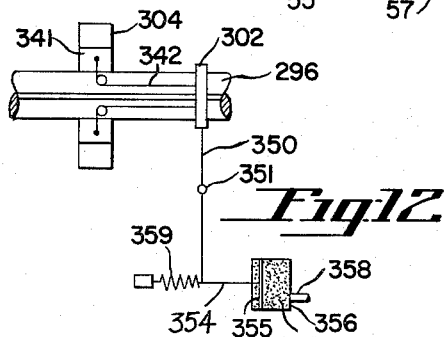
FIGURE 12 is a diagram showing the position of the valve control means with the vehicle in rest position.
Figure 13:
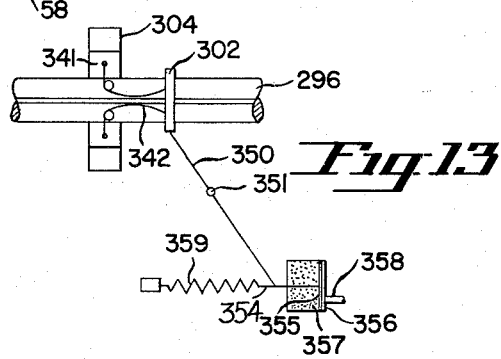
FIGURE 13 is a diagram showing another position of the valve control means which may exist when the vehicle is idling or operating at slow speeds.
Figure 14:
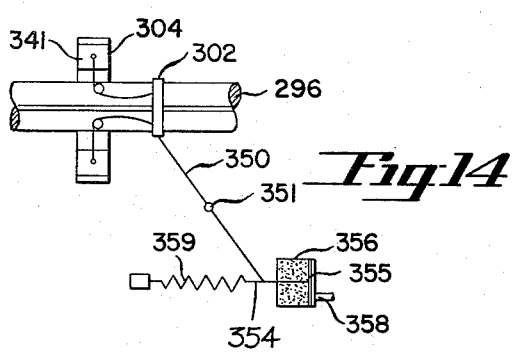
FIGURE 14 is a diagram showing the position of the valve control means when the vehicle is operating at normal speed in direct drive

The governor 304, as seen in FIGURES 5 and 6, comprises a housing 340 in which is radially slidable a pair of fly weights 341 having connected thereto a flexible strip 342 attached to the cross bar 302 in turn connected to yoke 303 which extends out of the control box 293' and is connected to shift means, shown in FIGURES 12, 13 and 14. The governor housing 340 is splined to the shaft extension 296 and the fly weights 341 are operative to pull the cross bar 302 toward the left or front of the control box predetermined distances depending upon the speed of the driven shaft. Illustrated in connection with the control box 293' is a ratio control rod 156' connected to the cross bar 302 and slidable therewith. This ratio control rod has a central bore 344 and the driven shaft has a spiral groove 345, only a part of which is shown, on the periphery thereof extending between the control box and the transmission housing. This groove communicates with a recess 348 in the front wall of the control box which in turn communicates with a small port 349 in the stator 307. Port 349 opens into the left-hand pump chamber 308, FIGURE 6, on the pressure side of vane 320, and, when the pump is in operation, some of the pumped fluid will be forced through the port 349 and into the transmission housing by means of recess 348 and groove 345. The fluid returns to the control box through the central bore 344 in the ratio control rod 156', and in its circulation through the transmission, said fluid is cooled to prevent overheating of the pump brake structure. Mounted on top of the control box 293' is an expansion chamber 346 which communicates with the interior of the control box 293' by a pipe 347. This expansion chamber permits expansion of the oil in the transmission and control box, if necessary.

The yoke 303, which is attached to the ratio control rod 156' by means of the cross bar 302, is connected to the upper end of a control lever 350, shown in FIGURES 10 and 11, pivoted on a pin 351 adjacent its upper end. Lever 350 is pivotally connected to a rod 354 attached to a diaphragm 355 in a housing 356 having a vacuum chamber 357. A vacuum line 358 leads to the chamber 357 and a spring 359 is connected to the lower end of the lever 350 to resist the pull of vacuum on the diaphragm. Vacuum line 358 leads to the intake manifold 324 through a solenoid operated spool valve 360. The spool of valve 369 has a stem 361 with valve elements 362 and 363 operative with suitable seat portions for opening and closing the vacuum line 358. With the coil of solenoid 360 energized, the valve element 363 closes off the vacuum line 358 and as no vacuum thus exists in the chamber 357 the diaphragm 355 is urged by the spring 359 to the left to move the lever 350 in a clockwise direction to the neutral position of the ratio control valves. With the coil of solenoid 360 deenergized vacuum is admitted to the vacuum chamber 357 in the diaphragm housing 356 and the diaphragm 355 is urged toward the right against the action of spring 359. In a desired arrangement, the vacuum existing in the chamber 357, when the throttle valve is closed or substantially closed, overcomes the opposing force of spring 359, but, when the engine throttle valve is almost or fully open, wherein there is less vacuum in the manifold, the spring 359 will overcome the pull of the vacuum and urge the lever clockwise toward ratio position of the motors, the extent of movement depending upon the vacuum condition in the chamber 357 and the forces being exerted by the governor fly weights 341. When the vehicle has attained a certain speed, the governor fly weights 341 assist the diaphragm 355 in overcoming the action of spring 359 so that at certain speeds when there is only a partial vacuum in the diaphragm chamber 357, the lever 350 will, nevertheless, be moved toward direct drive position.

The degree of vacuum in diaphragm chamber 357, FIGURE 10, varies inversely with changes in the torque load on the engine throughout all speeds of the vehicle. Therefore, when the engine becomes overloaded the vacuum is reduced, and at such times at low speed when the governor has no effect, spring 359 will overcome the vacuum pull and move lever 350 which in turn moves ratio control valve assembly to a position that causes the ratio motor valves to open, cutting in the additional motors necessary to enable the engine to handle the load under that particular operating condition. The farther the engine throttle is depressed the greater the driving ratio, until the engine has had an opportunity to gather speed to build up the vacuum in diaphragm chamber 357, which in turn causes the vacuum pull to overcome the tension of spring 359 and move lever 350 to a position that closes the ratio valves and cuts out the motors that are not needed.

The coil of solenoid 360 is series connected by a pair of wires 370 and 371 to a switch 372 operated by the vehicle throttle or accelerator pedal 373, the coil of a solenoid 374, the ignition switch 330, and a source of potential 375. The switch 372 has an arm 376 engageable by the vehicle throttle and when the vehicle throttle is retracted, the arm 376 bridges the contacts of the switch 372 to close the circuit wherein the coils of solenoids 360 and 374 will be energized. When the throttle is depressed, the arm 376 opens the switch to deenergize the coils of the solenoids, the arm being biased upwardly by a spring 377 confined between an abutment washer 378 on the arm and the vehicle floor board.

Solenoid 374 is mounted adjacent the lever 350 and has a plunger 380 adapted to project into the path of the lever 350, FIGURE 11, when the coil of the solenoid is deenergized and to be moved out of the path of said lever when the coil of the solenoid is energized, the plunger being biased to its outer position by suitable spring means. Thereby, when the throttle is depressed, the coil of the solenoid is deenergized and plunger 380 moves outwardly against the lever 350. When the lever 350 is pivoted a predetermined amount in a counterclockwise direction, FIGURE 10, out of the path of the plunger by the diaphragm 355 or the governor 304, or both, the plunger moves outwardly an additional distance to be in the return path of said lever. As long as the throttle is depressed, the plunger 380 will remain projected in the path of lever 350 and said lever cannot return to its fully retracted neutral position of FIGURE 10. The purpose of this structure is to prevent the lever 350 from pivoting to its fully retracted neutral position as long as the throttle is depressed. When the throttle is fully retracted the coil of the solenoid 374 is energized and the plunger is drawn inwardly wherein the lever 350 can move to its fully retracted position comprising the neutral position of the ratio control valves.

The operation of the control mechanism will now be described more fully and reference is made to FIGURES 12–14 comprising diagrams illustrating various positions of the valve control system at different speeds and operating conditions of the vehicle. The dotted shading in the diaphragm housings indicates the presence of atmospheric pressure on one or both sides of the diaphragm. The absence of dotted shading in the chambers indicates a partial vacuum condition corresponding to the reduced pressure existing in the engine manifold under different operating conditions with the throttle valve less than wide open.

FIGURE 12 shows the condition of the system when the engine is at rest. Atmospheric pressure exists on both sides of the diaphragm 355, and the spring 359 urges the lever 350 in a clockwise direction to its retracted position. When the ignition switch is turned on and the engine started and allowed to idle, the reduced pressure in the engine manifold does not exist in the diaphragm chamber 357 as long as the operator's foot is off the throttle because, as was described hereinbefore, the switch 372 is closed, FIGURE 10, when the throttle is retracted and the coil of solenoid 360 is energized. The spring 359 thereby still holds the control lever retracted wherein the ratio control valves are in neutral position. As the driven shaft is not rotating, the governor fly weights remain in their original position and the control parts thereby still assume their FIGURE 12 position. With the ratio control valves in neutral position, fluid moving through the pump 48 flows freely through annular pump pressure chamber 125, and through the passageway 128 leading to the discharge passageway 275 behind the neutral valve 271. The neutral valve 271 in the neutral position of the ratio control valves moves forwardly under the pressure of oil in the passageway 128, the fluid in front of the neutral valve flowing through passageway 262, through port 266, groove 252, port 259 and to passageway 257 to the reservoir.

When the operator places his foot on the throttle, the switch 372 is opened to deenergize the solenoids 360 and 374. If the throttle is opened only a slight amount, a low pressure will be present in the vacuum chamber 357, and the diaphragm 355 rapidly moves the shifting lever in a counterclockwise direction against the action of spring 359 to the direct drive position D, FIGURE 13, and, as was described hereinbefore, in this direct drive position, the ratio control valves 151, 152 and 153 are disposed in a position to direct fluid under pressure to the front end of the motor valves 135–138, whereby these latter valves are closed so that fluid cannot flow to the various motors. The moving of the ratio control valves to the direct drive position permits fluid under pressure to flow from passageway 253, port 255, groove 251, port 264 and passageway 262 to the front end of neutral valve 271 to close this valve, and, as the fluid is thereby trapped in the pump, the pump rotor 48 on the driving shaft hydraulically locks with the driven member 50 to establish the equivalent of a direct mechanical connection between the drive shaft and the driven shaft. If the throttle is depressed only a slight amount and a relatively low manifold pressure exists, the ratio control valves will remain in their direct drive position and the vehicle can be operated at low speed in direct drive.

When the throttle is depressed for normal acceleration, or in starting on an upgrade, the manifold pressure rises causing the pressure in chamber 357 to rise almost to atmospheric pressure whereby the spring 359 overcomes the pressure in said chamber and rotates the lever 350 clockwise to move the ratio control valves to the right and cut in one or more of the motors depending upon the torque requirements of the vehicle. At low speed, during normal acceleration, the governor weights do not assist the diaphragm 355. The force of spring 359 in relation to the various manifold pressures in the diaphragm chamber 357 is selected so that when the throttle is opened wide at low governor speed, the lever 350 will be pivoted clockwise by said spring to cut in all four motors while, if the throttle is opened a lesser amount, the lever will be pivoted to an intermediate position to select a transmission ratio suitable for the loading of the engine imposed by the operator. It will be apparent that if a start is made on a steep upgrade, the driven shaft 24 will not turn at sufficient speed to throw out the governor fly weights 341, and, as the throttle will be opened quite far, the pressure in the manifold will approach atmospheric pressure and the spring 359 will be effective to move the lever 350 to a position to cause the ratio control valves to cut in a desired number of motors. The motors 103a–106a preferably have different displacement values so as to produce the most torque when required, such as at slow starting speeds.

As the driven shaft 24 reaches a predetermined speed, the fly weights 341 of the governor move outwardly and move the control rod 156' to the left to move the ratio control valves in the same direction to cause a higher speed ratio position to be assumed. At this higher running speed the manifold pressure is increased but the governor weights are effective to assist the partial vacuum in the diaphragm chamber in overcoming the action of spring 359 at such speeds for moving the ratio control valves to direct drive. Such position of the parts is shown in FIGURE 14. In normal acceleration the ratio control valves will move gradually from right to left, FIGURE 4, toward direct drive position, depending, of course, on the amount of throttle opening. Normally, after the vehicle has attained a desired speed, the parts remain in their FIGURE 14 position which corresponds to the so-called high gear or direct drive operation of a gear transmission. Auxiliary means may be provided to enable the operator to shift the lever to a lower driving ratio whenever it may be necessary, such as when additional torque is desired for passing another vehicle or to relieve the laboring of the engine on a long hill before it has slowed down sufficiently to shift automatically.

A preferred arrangement of the governor 304 is to have the fly weights 341 engage the outer peripheral wall of the housing 340 before they cut out the last motor 103a so that the operation of this motor is not controlled by the governor. Motor 103a is thus free to move into and out of operation depending upon the torque requirements of the engine established by the pressure in the manifold independently of governor position.

An increase in load will cause the driven shaft to slow down somewhat and cause the operator to open the throttle wider wherein the pressure in diaphragm chamber 357 rises and the spring 359 can rotate the lever 350 clockwise to produce a down shift and cut in motor 103a, or, if the load warrants additional torque, more of the motors may be cut in. When the operator's foot is removed from the throttle, the solenoid 360 is energized to isolate the diaphragm 356 from the vehicle manifold and the spring 359 is free to move the lever 350 clockwise to move the ratio control valves to neutral position except that at fairly high speeds of the vehicle, the fly weights of the governor will hold the ratio control valves out of the neutral position. At slower speeds when the throttle is depressed quite far and the spring 359 overpowers the vacuum pull in the chamber 327, the lever 350 is prevented from moving to its fully retracted or neutral position because the plunger 380 is in its path and will remain in such position as long as the operator depresses the throttle. If the vehicle is coasting faster than idling speed, the engine will be driven by the driven shaft 24 through the overrunning clutch 280.

For reversing the movement of the vehicle, the operator moves the shifting lever to the reverse position, and the yoke 303 connected to said shifting lever causes the control rod 156' to move the ratio control valves to their forwardmost position which causes communication of the passageway 215 with the exhaust passageway 208 to the reservoir through the groove 201 of the ratio control valve 152 whereby the reversing valve 221 and the reverse discharge valve 218 are moved to the left wherein fluid passes through the reverse discharge valve. In the reverse position of the ratio control valves, the groove 161 of the valve 151 is in communication with the passageway 172 and fluid under pressure flows to the annular cylinder 288, FIGURE 1, to cause the shifting of the cage 118 which prevents clockwise rotation of the motor rotors. Although the reverse position of the control mechanism is illustrated as being located at the left-hand end of movement of said mechanism, it may be located as well on the opposite end by suitable arrangement of the grooves on the ratio control valves and associated passageways.

To operate the pump brake mechanism 305, which may in one instance be desirable when the vehicle is descending a hill, the foot pedal which operates the stem 314 is depressed to close the switch 331 which causes the energization of the coil of solenoid 326. Manifold vacuum is thus introduced into the diaphragm housings 321 to cause the vanes 320 to move into the pump chambers 303. As was described hereinbefore, the amount of braking effect is dependent upon the extent to which the foot pedal is depressed.

The pump brake mechanism 305 becomes operative as a hill holder upon the closing of governor switch 332, the contacts of which are closed below a predetermined speed such as five or six miles per hour, as was described. The closing of the contacts causes the vanes 320 to move into engagement with the rotors wherein the vanes will ride over the eccentric surfaces of the rotor, and, when the vehicle stops, the vanes mechanically engage the lobes of the rotor to hold the driven shaft against reverse rotation. In parking the vehicle, the emergency lever 317 is pulled rearwardly to move the one vane 320 into engagement with the rotor 306, and the foot lever for operating stem 314 is locked in a lowered position to cause the valve 313 to close off the port 311 to trap fluid in the pump and provide a hydraulic lock.

Figure 16:
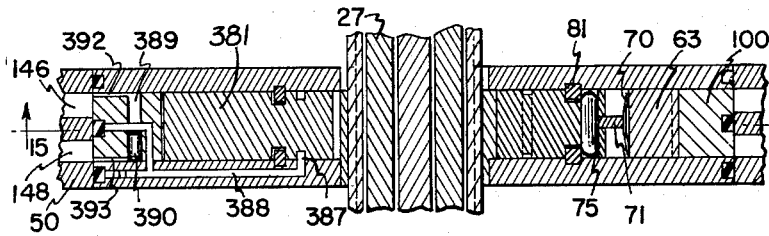
FIGURE 16 is a fragmentary longitudinal sectional view taken on the line 16—16 of FIGURE 15.
Figure 15:
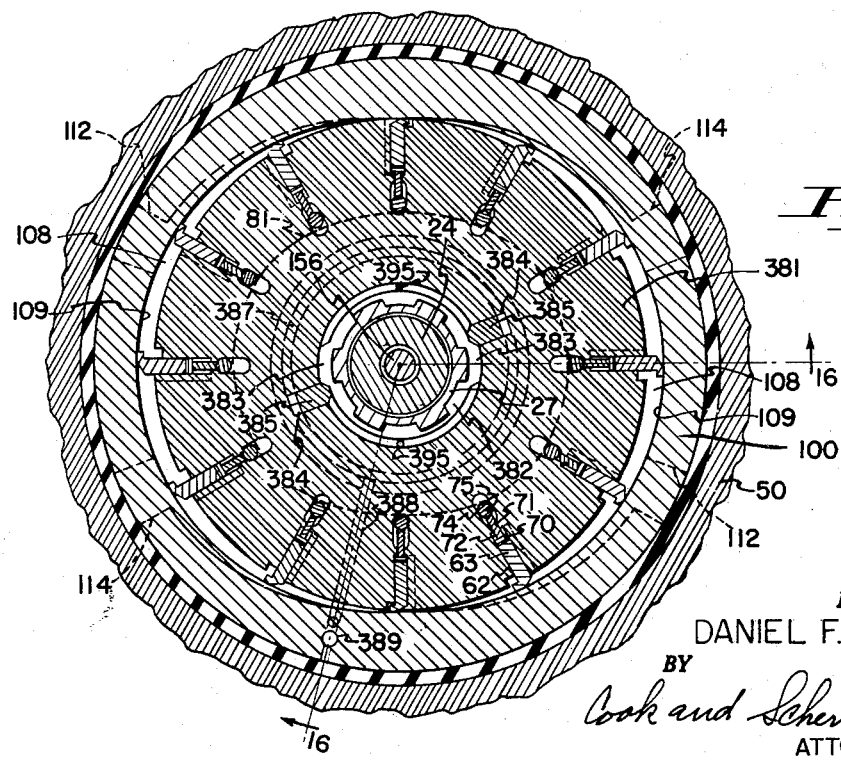
FIGURE 15 is a cross sectional view of a motor rotor utilizing a modified overrunning clutch or locking means between the motor rotor and a stationary member, taken on the line 15—15 of FIGURE 16.

FIGURES 15 and 16 illustrate a modified form of overrunning clutch or locking means operative on a motor rotor 381 to prevent rotation thereof when it is put in operation to produce reaction forces. In this modification the stationary sleeve 27 has splined thereon a sleeve 382 having a pair of projections 383. The rotor 381 has a pair of radial cylinders 384 in which are slidable plungers 385 tapered at their inner ends and adapted to engage the projections 383 on the sleeve 382 for preventing relative rotation between the rotor and the stationary sleeve 382. Communicating with the cylinders 384 at the outer ends thereof is an annular passageway 387 in turn communicating with a radial passageway 388 leading to a cylinder 389 disposed in parallel relation with the axis of the rotor. Slidable in the cylinder 389 is a piston valve 390 and disposed at opposite ends of the cylinder are ports 392 and 393 comprising inlet and outlet ports communicating, respectively, with the inlet and outlet passageways 146 and 148 in the driven member 50.

Similar to the rotors described in connection with the FIGURE 1 embodiment, the rotor 381 is operative in connection with cam rings 81 and has slots 62 in which are slidable vanes 63 urged outwardly by curved leaf springs 70 engageable by pins 71 slidable in radial holes 72 in the rotor which intersect the bottom of longitudinal slots 74 containing rollers 75. Vanes 63 operate in reaction or working chambers 108 formed by the inner cam surface 109 of the ring 100, the working chambers 108 communicating with inlet openings 112 and outlet openings 114.

In forward drive, fluid under pressure from the pump 48a flows through inlet passageway 146 through port 392 and into cylinder 389. This fluid pressure moves the piston valve 390 to the opposite side of the cylinder from the port 392, as seen in FIGURE 16, and fluid flows through the passageway 388 into the annular passageway 387. As the passageway 387 communicates with the cylinder 384, the fluid forces the plungers 385 inwardly to engage the projections 383 on the stationary sleeve 382 to stop rotation of the rotor. In reverse drive, the annular passageway 148 then comprises the inlet and the fluid under pressure flows into port 393 and moves the piston valve 390 to the other end of the cylinder, whereby fluid under pressure flows through passageway 388 into annular passageway 387 and into cylinder 384, the plungers 385 engaging the opposite side of the projections than in forward drive. Referring to FIGURE 15, passageways 395 open into the areas between the projections 383 and these passageways establish communication between said areas and the reservoir so that fluid will always be present in said areas. Thereby, when the rotor is stopped, the fluid in the areas between the projections 383 will provide an hydraulic shock absorbing means so that the plungers 385 will not forcefully mechanically engage the projections 383, but, rather, will ease up to the projections as the fluid leaks past the projections, a slight clearance being provided beteween the projections and the rotor to permit such leakage. It is to be understood, however, that the plungers 385 do not accomplish the entire braking force for stopping the rotation of the rotor because a braking force is also accomplished by fluid in the working chambers 108 acting against the vanes 63 upon the change of fluid conditions in said chambers.

The hydraulic mechanical lock accomplished by this structure thereby operates automatically as fluid pressure operates on the vanes 63 in forward and reverse drives. As the rotor starts to move in either direction after the fluid pressure has been released from its working chamber, the tapered end of plunger 385 engaging against the tapered stationary projections 383 will force the plungers 385 back into the slot in the rotor. Thereafter, as the rotor picks up speed, the plungers 385 are urged outwardly by centrifugal force to a position free of the projections 383.

*FIGURE 17 embodiment*

Figure 19:
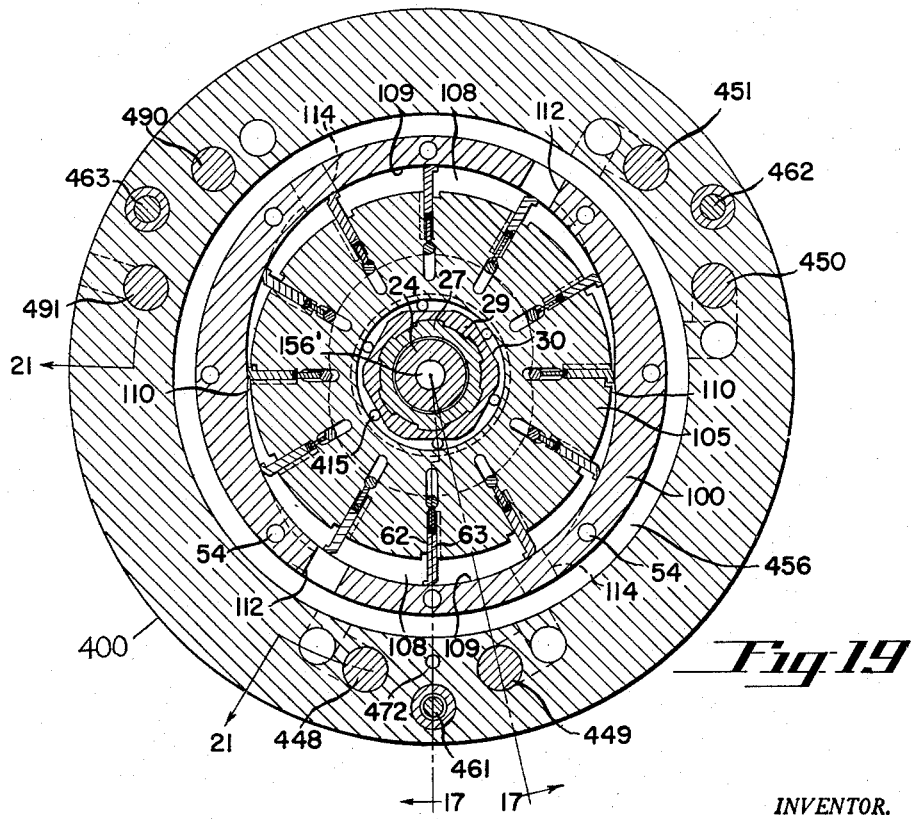
FIGURE 19 is a cross sectional view, taken on the line 19—19 of FIGURE 17.

FIGURES 17 through 21 show a second embodiment of the transmission, and, in this embodiment, an additional pair of rotors are provided, one of which is operative for accomplishing a reverse drive and to act as an hydraulic lock in the forward drive and both of which are operative for utilizing in ratio drive the engine compression as braking means for the vehicle. Similar to the FIGURE 1 embodiment, the numeral 20 designates a stationary frame member comprising an integral part of the vehicle chassis, and bolted to this member is a housing 21 for the present transmission. An opening 22 is provided at the front end of the housing 21 through which projects a drive shaft 23 from the internal combustion engine of the vehicle. The numeral 24 designates the driven shaft of the vehicle which is journaled in an integral sleeve 27 having outer splines 28 for providing a splined connection with another sleeve 29 having inner splines. The peripheral surface of the sleeve 29 has longitudinal flattened portions 30 to form in cross section, as shown in FIGURE 19, a hexagonal configuration.

The drive shaft 23 has a flange 35 which is bolted to a driving member 36 of the transmission having a starting ring gear 37 and a plurality of cooling fan blades 38. The driving member 36 has a front plate 42 which closes the housing for forming a fluid reservoir, this housing serving as the flywheel for the vehicle engine.

Driving member 36 has a rear flange 45 journaled on the sleeve 27, and this flange has outer splines 46 on which is mounted a pump rotor 48 of a pump 48a, the rotor 48 having a central bore with splines engageable with the splines 46. Pump 48a is identical with the pump 48a of the FIGURE 1 embodiment, a cross section of which is shown in FIGURE 2. The rotor 48 is disposed between a pair of radial plates 52 and 53 having clamped therebetween, by means of studs 54, a ring or annular part 55 forming pumping or working chambers 57 between the ring and the rotor. The shape of the ring 55 provides cam surfaces 58 engageable by radial vanes 63 slidably mounted in slots 62 in the rotor 48. Each of the vanes 63 is engaged by a curved leaf spring member 70 in turn engaged by a pin 71. The rotor 48 is provided with recesses 80 on opposite sides thereof to receive a pair of cam rings 81 also disposed in recesses 83 in the plates 52 and 53 and fixedly secured thereto by means of pins 84. Inlet ports 88 are provided in the plate 53 and outlet ports 89 are provided in the plate 52, these ports being adapted to communicate with the working chambers 57.

Disposed within the driving member 36 is a driven member 400 having an inner annular groove 401, FIGURES 17 and 18. A stop ring or carrier lock 402 having internal splines is mounted on the sleeve 27. This stop ring is stationary at all times and has three projections 404 between which are formed chambers 405 filled with fluid. Radially disposed in the driven member 400 are three bores or cylinders 406 having plungers 407 slidable therein. Plungers 407 have tapered end portions 408 which form dogs adapted to engage the projections 404 and prevent relative rotation between the driven member 400 and the stop ring 402. Plungers 407 have a central bore 410 which houses a spring 411 hooked at one end to the plunger by a pin 413 and hooked at its other end by a pin 413 in a fluid passageway 412.

The purpose of the stop ring 402 is to hold the driven member 400 stationary on the sleeve 27 when desired so that other parts of the transmission, to be described, can function in a reverse drive and a ratio compression braking operation, the reverse drive and the ratio compression braking being initiated by manual operation of a shift lever.

Driven member 400 has four rings or annular parts 100 clamped between five radial plates 101. Rotatably disposed between the sets of plates 101 are reaction members or rotors 103, 104, 105 and 106 of motors 103a, 104a, 105a, and 106a, respectively. As best seen in FIGURE 19, the inner peripheral surfaces of the rings 100 form diametrically opposite reaction or working chambers 108 between the rings and their respective rotors. The inner surfaces of the rings 100 form cam surfaces, designated by the numeral 109, which approach closely to the surface of the rotors at two points 110. These rings have diametrically opposite inlet openings 112 and outlet openings 114. Each of the rotors 103–106 is of similar construction, with the exception that, as shown in FIGURE 17, the rotor 106 is substantially wider than the others and, therefore, has greater displacement.

The rotors have a plurality of slots 62 in which are slidably mounted radial vanes 63 and other structure similar to that described in connection with the pump 48, and have recesses 80, FIGURE 17, on opposite sides thereof to receive a pair of cam rings 81 also disposed in fixed position in recesses 83 in the plates 101 by pins 84. Each of the rotors 103–106 is centrally bored for mounting on the stationary sleeve 29, and disposed between these rotors and the sleeves 29 on each of the longitudinal flat portions 30 is a roller 415 comprising locking means which prevent relative movement between the rotors and the stationary sleeves 29.

At the forward end of driven shaft 24 is a spindle portion 416 and a splined portion 417. Spindle 416 is journaled in a hub or stub shaft 418 which, in turn, has its opposite end journaled in suitable bearings 419 mounted in the end of the drive shaft 23. Hub 418 has a vertical slot 420 for receiving control means, to be described, and is provided with external splines 414 on a portion thereof. An overrunning clutch 421 utilizing rollers 422 is provided between the drive shaft and the hub 418 to prevent the driven shaft from overrunning the drive shaft. The end plate 42 of the driving member has splines 424 which mesh with splines on the overruning clutch mechanism for accomplishing the drive connection in one direction of rotation.

Figure 20:
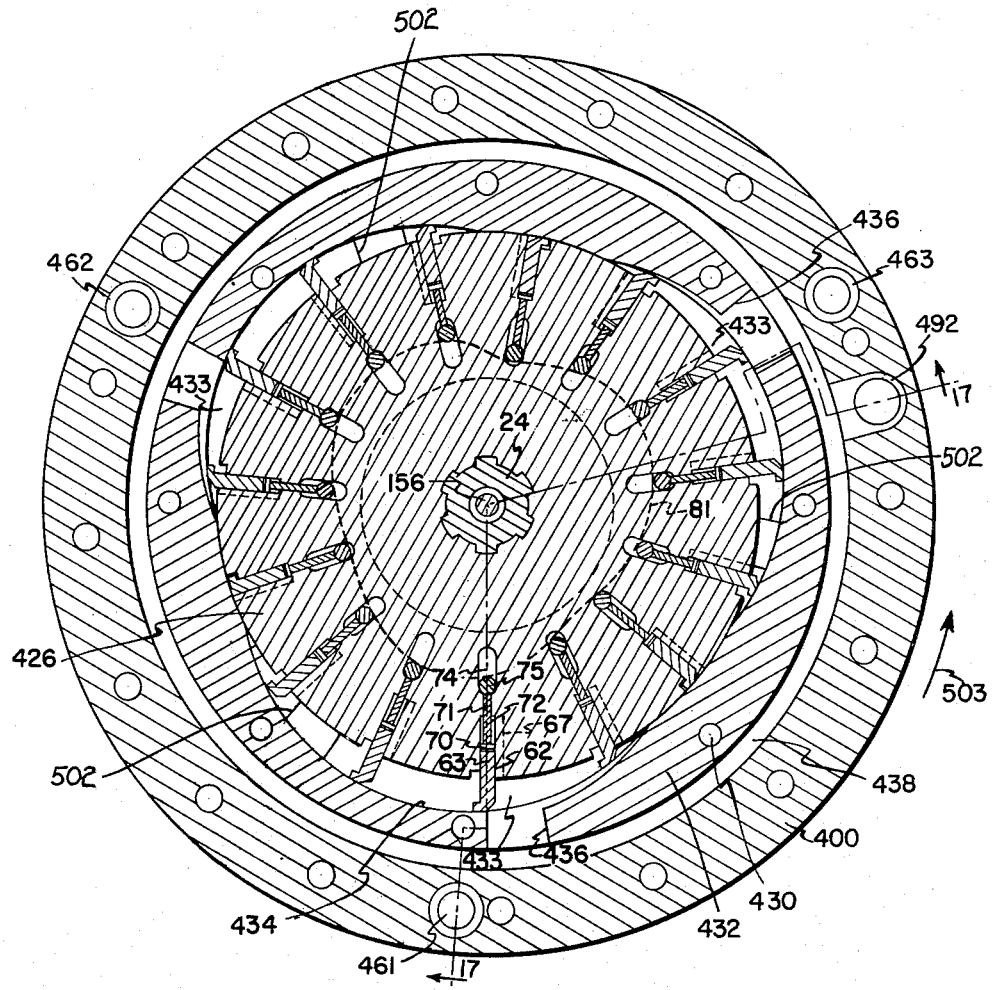
FIGURE 20 is a cross sectional view taken on the line 20—20 of FIGURE 17, showing the structure of a rotor utilized in forward, reverse and overdrive compression.

Disposed at the front end of the driven member 400 is a pair of rotors 426 and 427. Rotor 426 comprises a part of a fluid component 426a which serves at certain times as a motor and at other times as a pump. Rotor 427 comprises a part of a fluid motor 427a. Rotor 426 is disposed between one of the plates 101 and a radial plate 428, and the rotor 427 is disposed between the plate 428 and a radial plate 429. Rotor 426 is splined on the driven shaft 24 and the rotor 427 is splined on the stub shaft 418. Clamped between the plates 101 and 428 and plates 428 and 429 by studs 430 are rings or annular parts 432 forming pumping or working chambers 433 with the rotors, the rings 432 providing cam surfaces 434. FIGURE 20 is a cross sectional view of the rotor 426, but, as the rotors 426 and 427 are of substantially identical structure, they are described together as comprising the same structure, the only significant difference being that the width of the rotor 426 exceeds that of the rotor 427 so that the displacement thereof is greater. In a preferred form the rotor 426 is twice the displacement size of the rotor 427 so that with the driven member held stationary, as will be described, the rotor 427 will be caused to rotate twice as fast as the rotor 426 when the latter rotor operates as a pump and the rotor 427 operates as a motor.

The periphery of the rotors 426 and 427 has a plurality of slots 62 in which is mounted slidable radial vanes 63 and other structure similar to that described in connection with the pump rotor 48. The rotors have recesses 80 on opposite sides thereof to receive a pair of cam rings 81 mounted in fixed positions in recesses 83 in the plates 101, 428 and 429, the rings 83 being fixedly held in place by pins 84. Communicating with each of the working chambers 433 of the rotor 426 are outlet ports 436 in turn communicating with annular passageways 438. Discharge passageways 439, FIGURE 17, establish communication between working chambers 433 associated with rotor 427 and the reservoir, one of these passageways being shown in dotted lines.

FIGURE 17 valve assembly

In the forward drive of the transmission, pump rotor 48 operates one or more of the motors 103a–106a, depending upon the torque requirement of the vehicle, and the rotor 426 operates in an hydraulic lock with the driven member, to be described. Fluid forced out of the outlet ports 89 of the pump rotor 48 flows to an annular pump pressure chamber 440, FIGURES 17 and 21, through passageways 441 communicating between the ports 89 and the passageway 440. Communicating with the passageway 440 are a plurality of short longitudinally disposed passageways 443, one of which is shown in FIGURE 17 and all of which are shown in the developed view of FIGURE 21. Four of the passageways 443 lead to longitudinal motor valve cylinders 444 having counterbored portions 445 adjacent the front thereof each having a rear relief passageway 446 communicating with the reservoir. Slidably disposed in the cylinders 444 are piston type motor valves 448, 449, 450 and 451, and, as illustrated herein, the motor valve 448 controls the operation of motor 105a, motor valve 449 controls the operation of motor 103a, motor valve 450 controls the operation of motor 106a, and motor valve 451 controls the operation of motor 104a. Each of the four motor valves has a head portion 453 disposed in the counterbore 445, and these head portions have a front surface area larger than the surface area of the opposite ends of the valve, whereby if an equal fluid pressure is applied on both ends of the valves, they will move to the right to closed position. Each of the cylinders 444 for the motor valves 448–451 communicates with a port 454 which in turn communicates with an annular inlet passageway 456, FIG- URE 17, and although this figure shows only one of such passageways, there is one provided for each motor. In the position of the motor valves shown in FIGURE 21, fluid under pressure from the pump 48a can flow through chamber 440 and passageways 443 and 454 to the motors by means of annular passageways 456 and inlet ports 112. FIGURE 19. Also associated with the motors 103a–106a are outlet passageways 457 to the reservoir, these outlet passageways being shown in FIGURE 17 in dotted lines and being in communication with the outlet ports 114, FIGURE 19. FIGURE 17 shows the motor valve 449 in closed position wherein fluid pressure cannot flow to the motor 103a, but in FIGURE 21 this motor valve is shown in its left-hand or open position. The operation of each of the other motors 104a, 105a and 106a is controlled by its motor valve 451, 448, and 450, respectively, adapted to open or close similar ports 454.

Also provided in the driven member 400 are three cylinders 460 in which are slidable a first ratio control valve 461, a second ratio control valve 462, and a third ratio control valve 463, all connected to a common cross bar 155, in turn connected to the control rod 156' FIGURE 17, slidable in a central bore in the driven shaft 24, the bar 155 being slidable in the vertical slot 420 in the hub 418. Ratio control valve 461 is disposed between motor valve 448 and 449, and has three peripheral grooves 465, 466 and 467. Leading from the cylinder 460 for the ratio control valve 461 is a passageway 468 opening into the front of the counterbore 445 associated with motor valve 448, a passageway 469 communicating with the reservoir, a passageway 470 communicating with the reservoir, a passageway 471 opening into the front end of counterbore 445 associated with the motor valve 449, a passageway 472 communicating with the annular passageway 440, and a passageway 473 which leads to the stop ring 402 for a purpose to be described.

Ratio control valve 462 is disposed between motor valves 450 and 451 and has three peripheral grooves 475, 476 and 477. A passageway 479, leading from annular passageway 440, communicates with the cylinder for this ratio control valve through two ports 480 and 481, and also communicating with the cylinder for this ratio control valve is a passageway 482 which communicates with valve structure, to be described, associated with reverse and ratio compression, a passageway 483 to reservoir, a passageway 484 leading to the front end of the counterbore 445 associated with the motor valve 451, and a passageway 485 leading to the front end of counterbore 445 associated with the motor valve 450.

The ratio control valves 461 and 462 are shown in their limits of rearward travel, and in this position of the valves fluid from the pump pressure chamber 440 and passageways 443 can flow to the ports 454 leading to the motors, but, as will be seen, the valve assembly is in neutral position and no pressure is developed to operate the motors at this time. No fluid under pressure can flow to the front end of the motor valves, whereby these motor valves will remain in the position shown. However, when the ratio control valves move sufficiently to the left to establish communication between the chamber 440 and the front portion of the counterbores 445 of the motor valve cylinders 444 by registry of necessary grooves and passageways, then the motor valves will be retracted due to the fluid pressure which is exerted on the head portion of the valve, this fluid pressure on the head being greater than the fluid pressure on the other end of the valve due to the enlarged area of the head. As the ratio control valves move to the left the motors will cut out one by one, and, in direct drive, all the motors will be cut out and the pump 48a will drive the driven member 400 in a 1:1 ratio.

Also operatively mounted in the driven member 400 are valves 490, 491 and 492. Valve 490 is slidable in a cylinder 494 and comprises a reverse valve. Cylinder 494 for this valve has a counterbore 495 in which is disposed an enlarged head 496 on the valve 490. Reverse valve 490 has an annular groove 498, and disposed adjacent the valve is a passageway 499 having a plurality of branch passageways. A first branch passageway 500 leads to the rear end of the cylinder 494 and when the valve 490 is open, that is, when the controls are moved to the reverse position, fluid can flow from a passageway 443 into the passageway 499 which communicates with an annular passageway 501, FIGURE 17, in one of the plates 101, in turn communicating with ports 502. Ports 502 communicate with the working chambers 433 of the motor 426a and fluid under pressure flowing through port 502 produces counterclockwise rotation of the rotor 426, as indicated by the arrow 503 in FIGURE 20.

Passageway 499 has a second branch 504 which registers with the groove 498 of the reverse valve 490 when the valve is closed, as shown in FIGURE 21. The groove 498 also registers with a passageway 505 when the valve 490 is closed which leads to the annular passageway 438 associated with the motor 427a. Another branch passageway 507 passes throughh cylinder 460 for ratio control valve 463 and communicates with the passageway 412, FIGURES 17 and 18, associated with the stop ring structure 402 for purposes to be described, and yet another branch 508 leads to the valve 492. Passageway 482, from the cylinder of ratio control valve 462, has a branch 510 leading to the forward end of the counterbore 495 associated with reverse valve 490, and, when fluid pressure is present in the passageway 482 and its branch 510, the valve 490 will be forced to the right because of the increased piston area of the head as compared with the piston area of the opposite end.

Ratio control valve 463 has three annular grooves 511, 512 and 513, and associated with these grooves on the one side of the valve is a passageway 515 having a pair of outlet ports 516 and 517 opening into the cylinder 460 for the valve 463 and adapted at certain times to register with groove 512. Another passageway 519 leading to the reservoir has outlet ports 520 and 521 opening into the cylinder 460 and adapted at certain times to register with the groove 513 in the ratio control valve 463.

On the other side of the ratio control valve 463 is a passageway 523 having one end leading to the valve 491 and having outlet ports 524 and 525 opening into the cylinder 460 for the ratio control valve 463, these ports being adapted to be in registry with the groove 512 at certain times. Another passageway 527 has ports 528 and 529 opening into the cylinder 460 for this ratio valve and adapted to register with the groove 513 in the valve 463. The other end of passageway 527 leads to the valve 491.

Valve 491 is a neutral valve and is slidable in a cylinder 532 having a counterbore 533. Cylinder 532 communicates at one end with a passageway 443, and the counterbored portion 533 of the cylinder communicates with the passageways 523 and 527. Also in communication with the counterbored portion 533, at the opposite end thereof, is a passageway 535 leading to reservoir, and communicating with the opposite end of the cylinder 532 is another passageway 536 which leads to reservoir. The neutral valve 491 has a front bore 538, housing a spring 539 which biases the valve to the right toward closed position. When equal fluid pressure is present on both ends of the valve, the spring 539 urges the valve to its closed position, but if fluid pressure exists on the right end of the valve but not on the left end, the thrust of such fluid on the right end overcomes the force of the spring to move the valve to the left to open position wherein the transmission will be in neutral.

The valve 492 is a reverse discharge and compression intake valve and is slidable in a cylinder 541 having a counterbored portion 542. Valve 492 has an enlarged head portion 543 disposed in the counterbore 542. The left end of the cylinder 541 communicates with a passageway 545 which leads to the reservoir. The left end of cylinder 541 also communicates with a port 546 communicating with the annular passageway 438, FIGURE 17, in the motor 426a. The passageway 482 from the cylinder 460 for ratio control valve 462 leads into the counterbore 542 adjacent the right end to put fluid pressure at certain times on the top of the valve 492. The branch 508 of passageway 499 leads into the counterbore 542 adjacent its other end, and, when fluid pressure is present in this latter passageway and the passageway 482 is open to reservoir, the valve 492 is moved toward the right to its open position. If equal fluid pressure exists on both sides of the head 543, the enlarged piston area at the front of the head will cause the valve to move to the left to its closed position.

*FIGURE 17 valve operation*

In explaining the operation of the present transmission embodiment, it is to be understood that the control rod 156' is operated by a control mechanism of the type described in connection with the first embodiment. There is shown by dotted lines in FIGURE 21 the positions of the cross bar 155 for the various stages of operation of the valves. A first position, designated by the character N, is the neutral position which is the position illustrated in said figure. The next four position designations, moving from right to left, comprise M4, in which four motors are in operation in forward drive, M3, in which three motors are in operation, M2, in which two motors are in operation, and M1, in which one motor is in operation. Following the M1 position are direct drive, designated by the character D, ratio compression, designated by the character O—C, and reverse, designated by the character R. The ratio control valves in the neutral position of the transmission are disposed in their right-hand position, as shown in FIGURE 21, this position being assumed, for example, when the vehicle is standing still with the foot off the throttle. In such condition fluid pressure from the pump 48a exists in the pump pressure chamber 440 and such fluid pressure acts against the right-hand side of neutral valve 491 to urge this valve to the left, the groove 513 in the ratio control valve 463 in such neutral position being in registry with the branch 529 of the passageway 527, whereby fluid in front of the valve can escape to the reservoir. Groove 512 is not in registry with ports 517 and 525 of passageways 515 and 523, respectively, and no pressure exists at the front of the neutral valve. No fluid pressure at this stage exists in the passageways 468, 471, 485 and 484 leading to the left-hand end of the motor valves 448–451, respectively, so these valves will remain open, as shown. Although fluid can flow to the ports 454 leading to the motors 103a–106a, there will be no fluid pressure developed to operate these motors in view of the free discharge of the fluid through the passageway 536 associated with the neutral valve 491.

As the control assembly, which is responsive to torque requirements of the vehicle, moves the ratio control valves to the left from neutral toward direct drive position, the groove 512 in the ratio control valve 463 moves into communication with the branch passageway 525 of the passageway 523, whereby fluid pressure from passageway 515 is admitted to the top of the neutral valve 491 to force said valve closed. With this valve closed, fluid pressure from the pump cannot escape to the reservoir through the passageway 536. The groove 512 is in registry with the port 525 in all forward drive positions up to and including direct drive. The groove 475 in the ratio control valve 462 communicates with the passageway 482 in the neutral position and all other forward positions including direct drive, and fluid thereby can flow from passageway 479 through the port 480 to the groove 475 and thence to the passageway 482 to the top of reverse valve 490 and reverse discharge valve 492. This fluid pressure holds these two valves closed, and in the closed position thereof the port 500, FIGURE 21, and the port 546, FIGURE 17, are closed and fluid is trapped within the working chambers 433 of motor 426a. An hydraulic lock is thus formed in these working chambers between the driven member 400 and the rotor 426.

As the vehicle is operated, the valve control assembly will move the ratio control valves to the desired positions to cut the motors in and out, depending upon the torque requirements of the vehicle. The shifting lever for the present transmission has three manually operated positions for locating the ratio control valves as desired. These manual positions comprise reverse, ratio compression, and direct drive, designated, respectively, in FIGURE 21 by the reference characters R, O—C, and D. When the shift lever is in direct drive position, the transmission automatically moves in and out of direct drive or the other positions designated M1–M4 or N, depending upon the torque requirements of the vehicle. As the ratio control valves move to the left, FIGURE 21, out of neutral position and into the position designated by M4, the groove 512 comes into registry with port 525 of passageway 523 to close the neutral valve 491. All four reaction members are in operation in this position. With additional movement to the left to the position designated by the character M3, groove 477 of ratio control valve 462 first comes into registry with passageway 485 to permit fluid under pressure to flow to the front of motor valve 450 and close this valve to cut out motor 106a, wherein only three motors will be in operation. Further movement to the left to position M2 causes the groove 466 of ratio control valve 461 to register with the passageway 468 to close motor valve 448 and cut out motor 105a. In position M1, groove 477 registers with passageway 484 to cut out motor 104a, and, in position D, groove 466 registers with passageway 471 to cut out the last motor 103a. In direct drive, fluid cannot discharge from the pump 48 because all the motor valves are closed and, therefore, the pump and driven member will be hydraulically locked and a 1:1 ratio drive will result. In addition, as fluid is trapped in the working chambers between the rotor 426 and the driven member, the rotor 426 will rotate with the driven member to rotate the driven shaft 24. When running against one to one engine compression, an hydraulic lock is present between the two rotors 426 and 427 to establish a drive connection between the driven and drive shafts.

When it is desired to drive the vehicle in reverse, the shift lever is manually moved to the reverse position R, and, in this position, similar to direct drive, the grooves 466 and 477 in the ratio control valves 461 and 462, respectively, establish fluid pressure communication between the pump pressure chamber 440 and the top end of the motor valves whereby these valves are moved to their right-hand position to cut off fluid supply to the motors 103a–106a. Therefore, these motors have no function in the reverse operation of this transmission embodiment. The groove 476 of the ratio control valve 462 is at this stage of operation in registry with the passageways 482 and 483, whereby fluid at the tops of reverse valve 490 and reverse discharge valve 492 can escape to the reservoir through the passageway 483. Fluid pressure on the right-hand end of reverse valve 490 will thereupon forcefully open this valve. In this set position of the ratio control valves, groove 511 of ratio control valve 463 is in registry with passageway 507 and fluid can flow from a passageway 443 through port 500 to the passageway 499, whereby it then flows by means of passageway 507 to the passageway 412, FIGURE 18, associated with the stop ring structure 402. Fluid also flows to the passageway 508 which leads to the counterbore 542 behind the head 543 of reverse discharge valve 492, and when fluid pressure does not exist at the top of said valve, the pressure behind the head will move this valve to its open position. Movement of the reverse valve 490 to the left moves its groove 498 out of registry with the port 504 and fluid cannot flow into passageway 505.

Fluid in the passageway 412 associated with the stop ring 402 engages the top of the plungers 407 to urge these plungers inwardly into engagement with the projections 404 of the stop ring 402 to hold the driven member 400 stationary. Therefore, as long as fluid pressure exists on the top end of the plungers 407, a locking relation will exist between the stationary sleeve 27 and the driven member 400.

Fluid in this reverse drive is forced by the pump 48a through port 500 and passageway 499 into the passageway 501, FIGURE 17, and into the ports 502 which communicate with the working chambers 433 of the motor 426a. Fluid pressure in these working chambers is adapted to drive the rotor 426 in a counterclockwise direction, FIGURE 20, to drive the vehicle in reverse, the discharging fluid for this motor flowing through ports 436 which communicate with annular passageway 438, FIGURE 17, port 546 and through the passageway 545 behind the valve 492, this valve then being open.

In descending a hill or otherwise where compression of the engine is desired for braking the vehicle, the manual shift lever is moved to its ratio compression position O—C. In this position of the ratio control valves, the grooves 466 and 477 in the ratio control valves 461 and 462 establish communication between the pump 48a and the top of the motor valves 448–451 similar to the reverse position whereby the motors are cut out and do not operate in this stage of operation. As the rotor 426 is splined to the driven shaft 24, it will rotate at all times with the rear wheels, and, in the ratio compression stage of operation, the component 426a becomes a pump and operates the motor 427a. In ratio compression, the ratio control valve 462 is in a position so that its groove 476 is in registry with the passageway 482 whereby no fluid pressure exists at the top of the reverse discharge valve 492 and reverse valve 490 to hold these valves closed. Upon rotation of the rotor 426, fluid is drawn in from the reservoir through the passageway 545 and flows into port 546, passageway 438 of motor 426a, ports 436, working chambers 433 of the motor 426a and is discharged into port 502 to flow into passageways 501 and 499.

Fluid discharged from the motor 426a into the passageway 499, flows through port 504, the groove 498 of valve 490 and passageway 505, the valve 490 being in its right-hand position in this stage of operation. Passageway 505 communicates with annular passageway 438 associated with the motor 427a which, in turn, communicates with ports 436 of this motor leading to the working chambers 433. Fluid discharges from the working chambers 433 of rotor 427 through ports 439 to the reservoir, and as the driven member 400 is held stationary, the rotor 427 is operated at a speed by the motor 426a to apply a ratio compression on the vehicle engine dependent upon the displacement valves of the two rotors.

*Figure 22 embodiment*

FIGURES 22 through 26 show still another embodiment of the transmission, this embodiment being similar to the FIGURE 1 embodiment in its general arrangement, employing a pump and four motors or reaction members. A stationary frame member 20 comprising an integral part of the vehicle chassis has bolted thereto a housing 21 for the present transmission. This housing has an opening 22 in its front end which receives a drive shaft 23 from the vehicle engine. The numeral 24 designates the driven shaft of the vehicle which is journaled in an integral sleeve 27 having three peripheral grooves 560, best seen in FIGURE 23, forming projections 561 therebetween. The drive shaft 23 has a flange 35 which is bolted to a driving member 36 having a front plate 42 which closes the housing for forming a fluid reservoir, this housing serving as the flywheel for the vehicle engine. The driving member 36 has a rear flange 45 journaled on the sleeve 27, and the flange 45 has outer splines 46 on which is mounted a pump rotor 48 of a pump 48a, the pump rotor having a central bore with splines engageable with the splines 46. Pump 48a is identical with the pump 48a of the FIGURE 1 embodiment.

Rotor 48 is disposed between a pair of radial plates 52 and 53 having clamped therebetween by means of studs 54 a ring or annular part 55 having an internal shape forming pumping or working chambers 57 between the ring and the rotor. The shape of the ring 55 provides cam surfaces 58 engageable by radial vanes 63 slidably mounted in slots 62 in the rotor 48, the vanes 63 being associated with pump structure hereinbefore described comprising the spring means 70 for urging them against the cam surfaces 58. Plate 53 has inlet ports 88 and plate 52 has outlet ports 89, these ports being adapted to communicate with the working chambers 57.

Plates 52 and 53 associated with the pump 48a and the studs 54 form a part of a driven member 562. This driven member has four rings or annular parts 100 clamped between radial plates 101 and end structure, and rotatably disposed between the sets of plates 101 are reaction members or rotors 103, 104, 105 and 106 of motors 103a, 104a, 105a and 106a, respectively. The inner peripheral surfaces of rings 100 form diametrically opposite reaction or working chambers 108 with their respective rotors. Each of the rings has two pairs of inlet openings or ports 112 and two pairs of outlet openings or ports 114. The rotors have vanes 63 and other structure similar to that described hereinbefore, and also have the cam rings 81 and associated structure.

Each of the motor rotors 103–106 has individual overrunning clutch or locking means operative to prevent rotation thereof when it is put in operation, and referring particularly to FIGURE 23, which illustrates the construction of the rotor 103, radial cylinders 564 are provided in the rotors and have plungers 565 slidable therein with tapered inner end portions adapted to engage the projections 561 on the sleeve 27 for preventing relative rotation between the rotor and the stationary sleeve 27. Communicating with the cylinders 564 is an annular passageway 568 in turn communicating with radial passageways 569, best seen in FIGURES 22 and 26. Each passageway 569 leads to a cylinder 570, FIGURE 26, in the rings 100 disposed in parallel relation to the axis of the rotor, and slidable in the cylinders 570 are piston valves 572. Each of these cylinders has end ports 574 and 575. Ports 574 are in registry with ports 578, FIGURE 26, and ports 575 are in registry with ports 580, FIGURE 22. As will be better understood hereinafter, in forward drive fluid under pressure is admitted to ports 575 through ports 580 associated with the motors which are in operation, and in reverse drive fluid is admitted to ports 574 through ports 578. In forward drive the fluid pressure existing in ports 580 and 575 moves the piston valves 572 to the opposite end of the cylinders to close off ports 574, and in reverse drive the fluid pressure in ports 578 and 574 moves the piston valves to the opposite end to close off ports 575. In either forward or reverse drives, when fluid is introduced into the radial passageways 569, the plungers 565 move inwardly in their cylinders to engage the projection 561 of the sleeve 27 and stop rotation of the rotor. The structure and operation of the plungers 565 are similar to that shown and described in connection with FIGURE 15, except that in this latter embodiment, and as best seen in FIGURE 22, a pair of spring-pressed balls 581 are mounted in the plungers and provide a frictional grip with confining walls whereby when fluid pressure is relieved from the top of the plungers and the plungers are retracted in the cylinders due to engagement with the projections 561 and from centrifugal force upon free rotation of the rotors, the plungers will remain in such retracted position until fluid pressure is again admitted to the outer ends thereof.

Fluid forced out of the outlet ports 89 of the pump rotor 48 flows through an annular pump pressure chamber 582, and communicating with the chamber 582 are a plurality of short longitudinally disposed passageways 583 only one of which is shown in FIGURE 22. Passageways 583 communicate with an arcuate passageway 585, and opening into this latter passageway are two sets of four motor valve cylinders 587 having counterbored portions 588 adjacent the front thereof with rear relief passageways 589 leading to the reservoir. One of the cylinders is shown in FIGURE 22 and all are shown in FIGURE 23. Slidably disposed in the cylinders 587 are piston type motor valves 592, 593, 594 and 595. Each of the motor valves has a head 598 at its front end and a head 599 at the opposite end, this latter head being smaller in its end face area whereby, if equal fluid pressure exists at both ends of the valve, the increased area of head 598 will cause the valve to move to the right. The valves have reduced shank portions 601 adjacent the rear end thereof and each of the motor valve cylinders 587 has a discharge passageway 602 leading to the reservoir, whereby in reverse operation of the transmission, as will be further explained hereinafter, when the valves are disposed in their rearward position, fluid from the passageways 580 is free to discharge into the motor valve cylinders and out the ports 602. Each one of the passageways 580 communicates with one of the motor valve cylinders 587, as illustrated in FIGURE 23, in a manner similar to the communication between the cylinder for valve 592, FIGURE 22, and its passageway 580. The piston valves 572 are all shown in the plane of the views of FIGURES 22 and 26 for illustration purposes, but, in the actual construction, these valves are appropriately located adjacent their respective motor valves.

The cylinder for motor valve 595 communicates with a longitudinal passageway 605, FIGURE 23, offset therefrom which in turn communicates with the inlet passageway 580 associated with the respective rotor and only in this respect does this cylinder differ from the others.

Also disposed in the driven member in longitudinal relation are a pair of reverse valve cylinders 607, FIGURES 23 and 26, in which are slidably disposed balanced piston type reversing valves 608 having enlarged head portions 609. Cylinders 607 communicate with the pump pressure chamber 582 by means of passageway 585 and also communicate with auxiliary bores 610 in turn communicating with the passageways 578. Bores 611 intersect the cylinders 607 to establish communication between the bore 610 and the reservoir and, in forward drive of the transmission, the valves 608 are moved to the right to the dotted line 612, FIGURE 26, to close off communication with the pump pressure chamber. In such forward drive position, the ports 611 are open, i.e., the small shank portion of the valve is adjacent thereto, whereby fluid discharging from the working chambers 108 of the rotors is free to discharge through ports 114, passageways 578, bore 610, and ports 611 to the reservoir.

Also slidably mounted in the driven member 562 are four ratio control valves 614, all of which are shown in FIGURE 23 and one of which is shown in FIGURE 22. Similar to the FIGURE 1 embodiment these ratio control valves are all connected to a common cross bar 155, in turn connected to a control rod 156", and have peripheral grooves 616, FIGURE 23, adapted to communicate with a passageway 617 from the pump pressure chamber 582, as well as with other passageways for controlling operation of the motor valves and reverse valves. The ratio control rod 156" in this embodiment has projecting lugs 615 thereon, FIGURES 22 and 24, which slidably support said rod within the driven shaft and provide a passageway around the rod. The operation of the ratio control valves is similar to that described in connection with FIGURE 1. For introducing fluid under pressure to the front of motor valves 592 through 595 and the reverse valves 608, passageways 620, FIGURE 22, and passageways 621, respectively, FIGURE 26, are provided between the control valves and the front ends of each of the mentioned valves. In forward drive, fluid under pressure is present in the passageways 620 associated with those motors which are not in operation and also present in passageways 621 to hold the reversing valves to the right to shut off communication between passageways 585 and bores 610. In reverse drive, fluid under pressure is present in the passageways 620 leading to the forward end of the motor valves. It will be seen, therefore, that when a particular rotor is in operation in forward drive, no fluid pressure exists at the forward end of its motor valve whereby said valve is moved to the position shown in FIGURE 22 and fluid under pressure is free to flow from passageway 585 into the inlet ports 580, inlet ports 112, working chambers 108, outlet ports 114, passageways 578, bore 610, and ports 611 to reservoir. In reverse, fluid under pressure exists in front of the valves 592 through 595 to hold these valves to the right and no fluid pressure exists at the front end of the reverse valves 608 whereby fluid under pressure from the pump pressure chamber 582 flows through the passageways 583 and 585, auxiliary bore 610, ports 578 and into the working chambers of the motors through ports 114. Fluid discharges through the ports 112, ports 580, cylinders 587 and ports 602 to the reservoir, the heads 599 of the motor valves being disposed on the right side of ports 580, FIGURE 22, when these valves are moved to the right, to permit the flow of fluid from said ports into the motor valve cylinders and then out the ports 602. As seen in FIGURE 26, the ports 611 are closed by the valves 608 in the reverse position of the transmission. In neutral, the pump pressure chamber communicates directly with the reservoir as in previous embodiments.

The control rod 156" is automatically operated in forward drive by the control mechanism described in connection with the FIGURE 1 embodiment, the control mechanism moving the ratio control valves to desired position to cut the motors in and out depending upon the torque requirements of the vehicle.

The driven shaft 24 has a spiral groove 625, FIGURE 22, extending between the interior of the transmission housing and the control box 293' and, upon rotation of the driven shaft, fluid flows freely through this groove between these two units to effect a cooling of said fluid, as was described in connection with FIGURE 5, and returns to the control box through the passageway around the ratio control rod 156".

In forward drive, fluid under pressure existing in inlet ports 580 is adapted to flow through ports 575, FIGURES 22 and 26, to move the piston valves 572 to the left to close off ports 574, as illustrated in FIGURE 22. Fluid thereby can flow through radial passageways 569 and into annular passageway 568 and cylinders 564 to operate plungers 565. In reverse drive, the reverse valves 608 are in their left-hand position, FIGURE 26, and fluid under pressure thereby can flow through passageways 585, auxiliary bores 610, passageways 578 and ports 574 to move the piston valves 572 to the right whereby fluid is also admitted to the cylinders 564 to operate the plungers 565. When fluid pressure exists in the cylinders 564, the plungers 565 are forced inwardly into engagement with the projections 561 on the stationary sleeve 27 to stop rotation of the rotor. Such rotors are held in a non-rotative position by the fluid operated plungers 565 when in operation in ratio forward drive or when in reverse drive, to produce a reaction member in said drives. When a rotor is taken out of operation, fluid pressure is relieved from the cylinders 564 and the plungers move back away from the projections 561 and are held in such retracted position by frictional engagement of the spring-pressed balls 581 with confining wall structure.

A control box 293", shown in FIGURE 22, comprises a part of this latter transmission, and encloses a pump-brake structure 305 similar to that illustrated in FIGURES 5 and 7. Similar to the former embodiment, the box also encloses a pair of gears 294 and 295 and a cross bar 302 connected to the rod 156" and to a yoke 303. The governor structure 304' in this control box is of somewhat different structure than the embodiment described hereinbefore and comprises a housing 630 having fly weights 631 slidable therein. These fly weights are pivotally connected to links 632 in turn pivotally connected to pivoted fingers 634. Fingers 634 engage a sliding washer 635 on the rod 156" and also disposed on this rod is a spring 636 confined between the sliding washer 635 and a stationary washer or flange 637.

The transmission of FIGURE 22 is utilized with control mechanism illustrated in FIGURES 10 and 11, and the purpose of the spring 636 on the rod 156" is to assist the vacuum diaphragm, after the governor is locked out, to help hold the transmission in direct drive above a predetermined low pressure in the diaphragm. That is, when the governor weights 631 are at their outermost limit position, the washer 635 serves as a stationary abutment and the spring biases the rod 156" to the left which is toward direct drive, whereby when it is desired to pass another vehicle or otherwise accelerate when the vehicle is travelling at a relatively fast speed and the throttle is depressed to raise the pressure on the diaphragm, the spring 636 assists the diaphragm in holding the control rod to the left which is its direct drive position.

Having now described my invention and in what manner the same may be used, what I claim as new and desired to protect by Letters Patent is:

1. A reversible fluid transmission comprising a driving member, a driven member, a plurality of individually rotatable reaction members, vanes on said reaction members, said driven member forming with said driving member a fluid pump, and said driven member forming with each of said reaction members a separate fluid motor to receive fluid from said pump, valve means adapted to direct fluid selectively to opposite sides of said vanes for forward and reverse drives wherein said motors are capable of applying torque to said driven member in both forward and reverse directions of rotation, and individual locking means operable on said reaction members, said locking means in forward drive permitting forward rotation of said reaction members and preventing reverse rotation thereof, and said locking means in reverse drive preventing rotation of said reaction members in either direction.

2. A reversible fluid transmission comprising a driving member, a driven member, a plurality of individually rotatable reaction members, vanes on said reaction members, said driven member forming with said driving member a fluid pump, and said driven member forming with each of said reaction members a separate fluid motor to receive fluid selectively from said pump, fluid pressure operated individual locking means operable on said reaction members to permit said reaction members to rotate with said driven member in said motors which are not in use and to lock said reaction members in a stationary position in said motors which are in use, and fluid passages and valves to control the flow of fluid from said pump to said motors in forward and reverse drives.

3. A reversible fluid transmission comprising a driving member, a driven member, a plurality of individually rotatable reaction members, vanes on said reaction members, said driven member forming with said driving member a fluid pump, and said driven member forming with each of said reaction members a separate fluid motor to receive fluid from said pump, fluid pressure operated individual locking means on said reaction members, piston type valves in said driven member adapted to direct fluid to opposite sides of said vanes wherein said motors are capable of applying torque to said driven member in both forward and reverse directions of rotation, ratio control valves controlling the operation of said piston type valves, and control means responsive to manifold pressure and vehicle speed for operating said ratio control valves.

4. A fluid transmission comprising a drive shaft and a driven shaft, a driving member secured to said drive shaft, a driven member, a plurality of individual reaction members, said driven member forming with said driving member a fluid pump and said driven member forming with each of said reaction members a separate fluid motor to receive fluid from said pump for driving said driven member, said reaction members being mounted on a stationary sleeve having radial projections, radial pistons in said reaction members adapted to move inwardly into engagement with said projections for holding said reaction members stationary, fluid inlet means between said projections to provide a fluid cushion between said projections and said pistons, and fluid passageways for directing fluid under pressure to said pistons.

5. A fluid transmission for a vehicle having an accelerator pedal comprising a drive shaft and a driven shaft, a driving member secured to said drive shaft, a driven member, a plurality of individual reaction members, said driven member forming with said driving member a fluid pump and said driven member forming with each of said reaction members a separate fluid motor to receive fluid from said pump for driving said driven member, control valve means having movement in one direction through a neutral position, ratio positions, and a direct drive position and having return movement, control means connected to said control valve means and having movement with said control valve means, stop means associated with said control means to interrupt the return movement of said control valve means at selected times, and electric switch means operable by the vehicle accelerator pedal for controlling said stop means.

6. In a vehicle having an accelerator pedal and a fluid transmission for an internal combustion engine having an intake manifold, said transmission having a driven shaft, a transmission control member mounted for longitudinal sliding movement relative to said shaft through neutral position, ratio positions, and direct drive position and return, a spring urging said control member in one direction, a diaphragm responsive to low intake manifold pressure of the engine to oppose said spring, a centrifugal governor driven by said driven shaft operative by vehicle speed to assist said diaphragm, a solenoid mounted adjacent said control member having a plunger arranged to project into the path of said control member, and electric switch means operable by the vehicle accelerator pedal for energizing said solenoid when said pedal is retracted to withdraw said plunger from the path of said control member and for deenergizing said solenoid when said pedal is depressed to permit said plunger to project into the path of said control member preventing its return to neutral position.

7. A fluid transmission comprising a driving and a driven shaft, a driven member, a stationary member, said driving and said driven members forming a pump, rotatable rotors mounted on said stationary member, said rotors and said driven member forming a plurality of motors, means to individually lock said rotors to said stationary member, valve means to direct fluid from said pump into a selective number of said motors, a rotor mounted on said driven shaft, said driven shaft rotor forming with said driven member a hydraulic lock to drive said driven shaft in the forward direction, a stub shaft, a rotor mounted on said stub shaft, an overrunning clutch means connecting said stub shaft with said driving member, said driven member and said stub shaft rotor forming a hydraulic lock to drive the engine in a 1 to 1 ratio against compression when the vehicle wheels drive said driven shaft rotor.

8. A fluid transmission comprising a drive shaft and a driven shaft, a pump operated by said driving shaft, motors operated by said pump, a driven member common to said pump and said motors, valve means directing fluid selectively to said motors, a rotor mounted on said driven shaft, a stub shaft, a second rotor mounted on said stub shaft, said stub shaft connected to said driving member by overrunning means in one direction, said common driven member forming separate working chambers with said first and second rotors, said first rotor and said working chamber thereof forming a hydraulic lock to operate said driven shaft in the forward direction, means to hold said driven member stationary, valve means to direct fluid from said pump to said working chamber of said first rotor to operate said driven shaft in reverse, and valve means to direct fluid from said working chamber of said first rotor to said working chamber of said second rotor.

9. A fluid transmission comprising a driving member, a driven member, a plurality of individually rotatable reaction members, said driving member forming with said driven member a fluid pump, said driven member forming with each of said reaction members a separate fluid motor to receive fluid from said pump, valve and passageway means to selectively control the number of said motors receiving fluid from said pump for forward drive, valve and passageway means to direct fluid from said pump to all of said motors for reverse drive, and locking means permitting individual rotation of each reaction member when its motor is not in operation and holding each reaction member stationary when its motor is in operation.

10. A reversible fluid transmission comprising a driving member, a driven member and a plurality of individually rotatable reaction members; said driven member forming with said driving member a fluid pump, said driven member forming with each of said reaction members a separate fluid motor; valve means and passageways arranged to direct fluid from said pump selectively into one or more of said motors in forward ratio drive, to shut off discharge from said pump and thereby hydraulically lock said driven member to said driving member in forward direct drive, and to direct fluid from said pump into said motors in reverse drive; individual locking means for each reaction member to prevent rotation thereof in either direction, and means operable by fluid pressure from said pump controlling the action of said locking means, said locking means having the characteristic of a one way overrunning brake in forward ratio drive to permit forward rotation of the reaction members in any motors not receiving fluid pressure from said pump.

11. A transmission as defined in claim 10, said locking means comprising overrunning brake elements actuated by fluid pressure in reverse drive to prevent forward rotation of the reaction members.

12. A transmission as defined in claim 11 including overrunning brake elements preventing reverse rotation of the reaction members at all times, overrunning brake elements for preventing forward rotation, means normally retracting said last brake elements in forward drive, and means actuated by fluid pressure in reverse drive to release said retracting means.

13. A transmission as defined in claim 10 including a stationary sleeve having radial projections, said locking means comprising radial pistons in said reaction members movable inwardly into engagement with said projections by fluid pressure in said motors in both forward and reverse drives and movable outwardly by centrifugal force to disengage said projections when there is no fluid pressure in said motors, and sloping ends on said pistons to cam the pistons outwardly when there is no fluid pressure in said motors.

14. A transmission as defined in claim 13 including fluid inlet means between said projections to provide a fluid cushion between said projections and pistons.

15. A fluid transmission comprising a driving member, a driven member and a plurality of individually rotatable reaction members, said driven member forming with said driving member a fluid pump, and with each of said reaction members a separate fluid motor to receive fluid from said pump, valve means to selectively control the specific motors receiving fluid from said pump for forward and reverse drives, said reaction members having vanes mounted therein forming working chambers in said driven member, a stationary member, pistons in said reaction members having locking engagement with said stationary member, and double check valves and passageways in said reaction members directing fluid from said working chambers to said pistons individually locking each reaction member stationary when its motor is in operation in forward or reverse drive.

16. A fluid transmission comprising a driving member mounted on an internal combustion engine output shaft, a transmission output shaft, a driven member mounted on said transmission output shaft, a plurality of individually rotatable reaction members, said driven member forming with said driving member a fluid pump and with each of said reaction members a separate fluid motor to receive fluid from said pump, valve means controlling said motors receiving fluid from said pump for either forward or reverse drive, a stationary member, means to lock each of said reaction members individually to said stationary member when its motor is in operation, means to operate said valve means, a vacuum operated member connection to the intake manifold of said engine tending to hold said valve operating means in the forward drive position, governor weights to assist said vacuum member, a spring tending to hold said valve control means in a neutral position tending to counteract the forces of said vacuum member and said governor weights, valve means to interrupt the vacuum from said manifold, a one way overrunning brake between said transmission and engine output shaft causing a one to one drive against engine compression when said transmission output shaft tends to run faster than said engine output shaft, a control box, a pump mounted on said transmission output shaft comprising a stator, a rotor and vanes to bear on said rotor, means to control the operation of said vanes, and a valve to control the discharge from said pump forming a hydraulic brake to assist the braking effect of compression.

17. A fluid transmission comprising a driving member and a driven member, a plurality of individually rotatable reaction members, said driven member forming with said driving member a fluid pump and forming with each of said reaction members a separate fluid motor to receive fluid from said pump, valve means individually controlling the motors receiving fluid from said pump for forward drive through said motors and for direct drive and neutral, valve means controlling the fluid from said pump to said motors for the reverse drive, said reverse valves providing discharge ports for said motor when in forward drive and said forward drive valves providing discharge ports for said reverse drive, a stationary member, pistons mounted in said reaction members, means to direct fluid under pressure to said pistons to lock said reaction members to said stationary member simultaneously with the placing of said motors in operation, control valves to hydraulically operate said motor valves, vacuum means tending to hold said control valves toward a direct drive position, a spring opposing said vacuum means tending to hold said control valves toward a neutral position, speed governor weights assisting said vacuum means tending to hold said control valves toward a direct drive position and to consecutively lock out a fluid motor as the speed of said driven member increases, said governor weights being ineffective for moving said control valves above a predetermined speed of rotation of said driven member, and a second spring mounted on said control means arranged to permit one of said motors to operate above said predetermined speed when vacuum in said vacuum member is below a predetermined value.

18. A fluid transmission comprising a driving member, said driving member forming a fluid reservoir, a driven member, a plurality of individually rotatable reaction members, said driven member forming with said driving member a fluid pump, said driven member forming with each of said reaction members a separate fluid motor to receive fluid from said pump, a stationary member, each of said reaction members comprising a rotor with vanes mounted therein bearing against said driven member to form fluid motor chambers, pistons in said rotors forming means to individually lock said rotors to said stationary member, separate valves to individually control said fluid motors for forward drive, valves directing fluid to said motors for reverse drive, said forward drive valves being of the piston pressure type having an enlarged head on one end with the smaller end exposed to fluid pressure, neutral valves of the piston type having a spring mounted on one end and arranged to receive fluid pressure with the opposite end exposed to fluid pressure, said reverse valves having discharge ports for forward drive, said forward drive valve having discharge ports for reverse drive, control valves arranged to apply fluid pressure individually or collectively on said enlarged heads of said forward drive valves to close said valves and to release the fluid pressure from said enlarged heads to permit said valves to open, said neutral valves being provided with means to by-pass the fluid back to the intake of said pump, and engine torque responsive means to operate said control valves.

19. A fluid transmission comprising a driving shaft and a driven shaft, a driving member and a driven member, a stationary member, said driving and driven member forming a fluid pump, a series of rotors mounted on said stationary member, said rotors and said driven member forming a plurality of fluid motors, valve means to direct fluid from said pump to a selective number of said motors, means to individually lock said rotors to said stationary member when their respective motors are in operation, a rotor mounted on said driven shaft, said last rotor forming with said driven member a hydraulic lock to drive said driven shaft in a forward direction, means to lock said driven member stationary, and valve and passageway means to direct fluid from said pump to drive said last rotor and said driven shaft in the reverse direction.

References Cited in the file of this patent

UNITED STATES PATENTS

| | | |
|---|---|---|
| 1,945,606 | Gudgeon | Feb. 6, 1934 |
| 2,309,051 | Dodge | Jan. 19, 1943 |
| 2,539,649 | Winther | Jan. 30, 1951 |
| 2,574,819 | Eisle | Nov. 13, 1951 |
| 2,658,343 | McGill | Nov. 10, 1953 |
| 2,697,912 | Berry | Dec. 28, 1954 |
| 2,704,923 | Eisele | Mar. 29, 1955 |
| 2,737,020 | Berry | Mar. 6, 1956 |
| 2,750,008 | Gassot | June 12, 1956 |